(12) United States Patent
Bisson et al.

(10) Patent No.: US 12,047,162 B2
(45) Date of Patent: Jul. 23, 2024

(54) ADAPTIVE CHANNEL LOADING IN WDM OPTICAL COMMUNICATION SYSTEMS

(71) Applicant: Nokia Solutions and Networks Oy, Espoo (FI)

(72) Inventors: Arnaud Bisson, Paris (FR); Milosav Andelic, New Providence, NJ (US); Giovanni Bellotti, Parma (IT); Eliana Vercelli, Milan (IT)

(73) Assignee: Nokia Solutions and Networks Oy, Espoo (FI)

( * ) Notice: Subject to any disclaimer, the term of this patent is extended or adjusted under 35 U.S.C. 154(b) by 104 days.

(21) Appl. No.: 17/820,591

(22) Filed: Aug. 18, 2022

(65) Prior Publication Data
US 2023/0059280 A1 Feb. 23, 2023

(30) Foreign Application Priority Data
Aug. 19, 2021 (EP) .................................... 21192102

(51) Int. Cl.
*H04J 14/02* (2006.01)
(52) U.S. Cl.
CPC .............................. *H04J 14/0227* (2013.01)
(58) Field of Classification Search
None
See application file for complete search history.

(56) References Cited

U.S. PATENT DOCUMENTS

| | | | |
|---|---|---|---|
| 6,400,478 B1 | 6/2002 | Cheng et al. | |
| 6,445,472 B1 * | 9/2002 | Kim | H04J 14/025 |
| | | | 398/79 |
| 6,512,612 B1 * | 1/2003 | Fatehi | H04Q 11/0005 |
| | | | 398/55 |
| 7,092,642 B2 | 8/2006 | Way | |
| (Continued) | | | |

FOREIGN PATENT DOCUMENTS

| | | |
|---|---|---|
| CN | 104836736 B | 3/2018 |
| WO | 20200132764 A1 | 7/2020 |

OTHER PUBLICATIONS

Telecommunication Standardization Sector of ITU, Series G: Transmission Systems and Media, Digital Systems and Networks, https://handle.itu.int/11.1002/1000/11830.

(Continued)

*Primary Examiner* — Jai M Lee
(74) *Attorney, Agent, or Firm* — Stratford Group Ltd.

(57) ABSTRACT

A method includes, for each optical fiber path in an optical network, allocating an optical wavelength channel in an optical spectrum such that the allocated optical wavelength channel is assigned to support optical communications over the optical fiber path. The method also includes updating an allocation table in response to performing the allocating for one or more of the optical fiber paths; the allocating including determining the optical wavelength channel to be allocated based on a state of the allocation table. The allocation table indicates optical wavelength channels allocated over optical fiber spans of the optical network. The method also (Continued)

includes defining a set of optical sub-bands to cover a part of the optical spectrum in response to a state of the allocation table satisfying a fullness property. The optical sub-bands are such that each of the allocated wavelength channels is in one of the optical sub-bands.

18 Claims, 13 Drawing Sheets

(56) References Cited

U.S. PATENT DOCUMENTS

| | | | | |
|---|---|---|---|---|
| 7,116,904 | B2* | 10/2006 | Maki | H04B 10/0793 398/56 |
| 7,167,650 | B2 | 1/2007 | Farries | |
| 7,359,112 | B2* | 4/2008 | Nishihara | H01S 3/13013 359/341.41 |
| 7,466,916 | B2 | 12/2008 | Mitra et al. | |
| 7,697,455 | B2* | 4/2010 | Sadanada | H04J 14/0257 370/254 |
| 8,774,626 | B2* | 7/2014 | Bernstein | H04J 14/0267 398/79 |
| 9,042,726 | B2* | 5/2015 | Togo | H04J 14/0269 398/49 |
| 9,357,278 | B2* | 5/2016 | Swinkels | H04L 45/04 |
| 9,686,599 | B2* | 6/2017 | Maamoun | H04J 14/0257 |
| 9,698,930 | B2* | 7/2017 | Wang | H04J 14/022 |
| 9,831,978 | B1 | 11/2017 | Mehrvar et al. | |
| 9,838,111 | B2* | 12/2017 | Schmidtke | H04L 69/324 |
| 10,090,923 | B2* | 10/2018 | Takita | H04B 10/07957 |
| 10,389,473 | B1 | 8/2019 | Vassilieva et al. | |
| 10,404,401 | B1* | 9/2019 | Maamoun | H04J 14/0271 |
| 10,411,806 | B2* | 9/2019 | Prakash | H04J 14/0257 |
| 10,574,381 | B2* | 2/2020 | Wright | H04J 14/0257 |
| 2002/0003643 | A1 | 1/2002 | Qian et al. | |
| 2009/0297151 | A1* | 12/2009 | Yoneda | H04J 14/0256 398/79 |
| 2018/0076920 | A1 | 3/2018 | Li | |
| 2018/0287697 | A1 | 10/2018 | Kilper et al. | |
| 2021/0083790 | A1 | 3/2021 | Boertjes et al. | |

OTHER PUBLICATIONS

Amar, D. et al., "Spectrum fragmentation issue in flexible optical networks: analysis and good practices". Photon Netw Commun 29, 230-243 (2015). https://doi.org/10.1007/s11107-015-0487-1.

F. Buchali et al., "DCI Field Trial Demonstrating 1.3-Tb/s Single-Channel and 50.8-Tb/s WDM Transmission Capacity," in Journal of Lightwave Technology, vol. 38, No. 9, pp. 2710-2718, May 1, 2020, doi: 10.1109/JLT.2020.2981256.

European Search Report from corresponding EP Application No. 21 192 102.8 dated Sep. 2, 2022.

W. Vinoth Kumar et al., "DWDM Channel Spacing Effects on the Signal Quality for DWDM/CWDM FTTx Network1", Journal of Optical Communications, vol. 43, Feb. 7, 2019, 0.1515/joc-2019-0012.

* cited by examiner

400

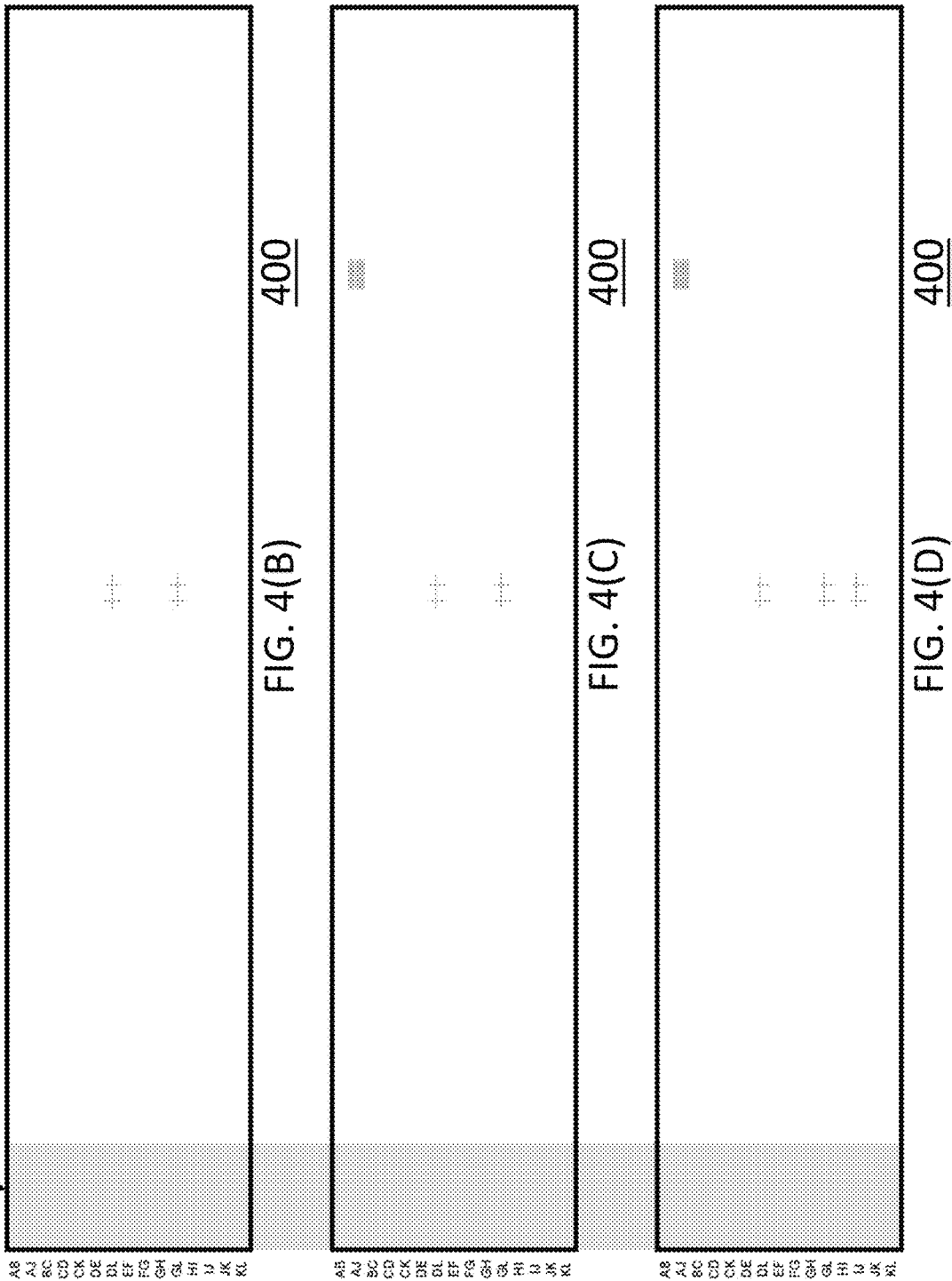

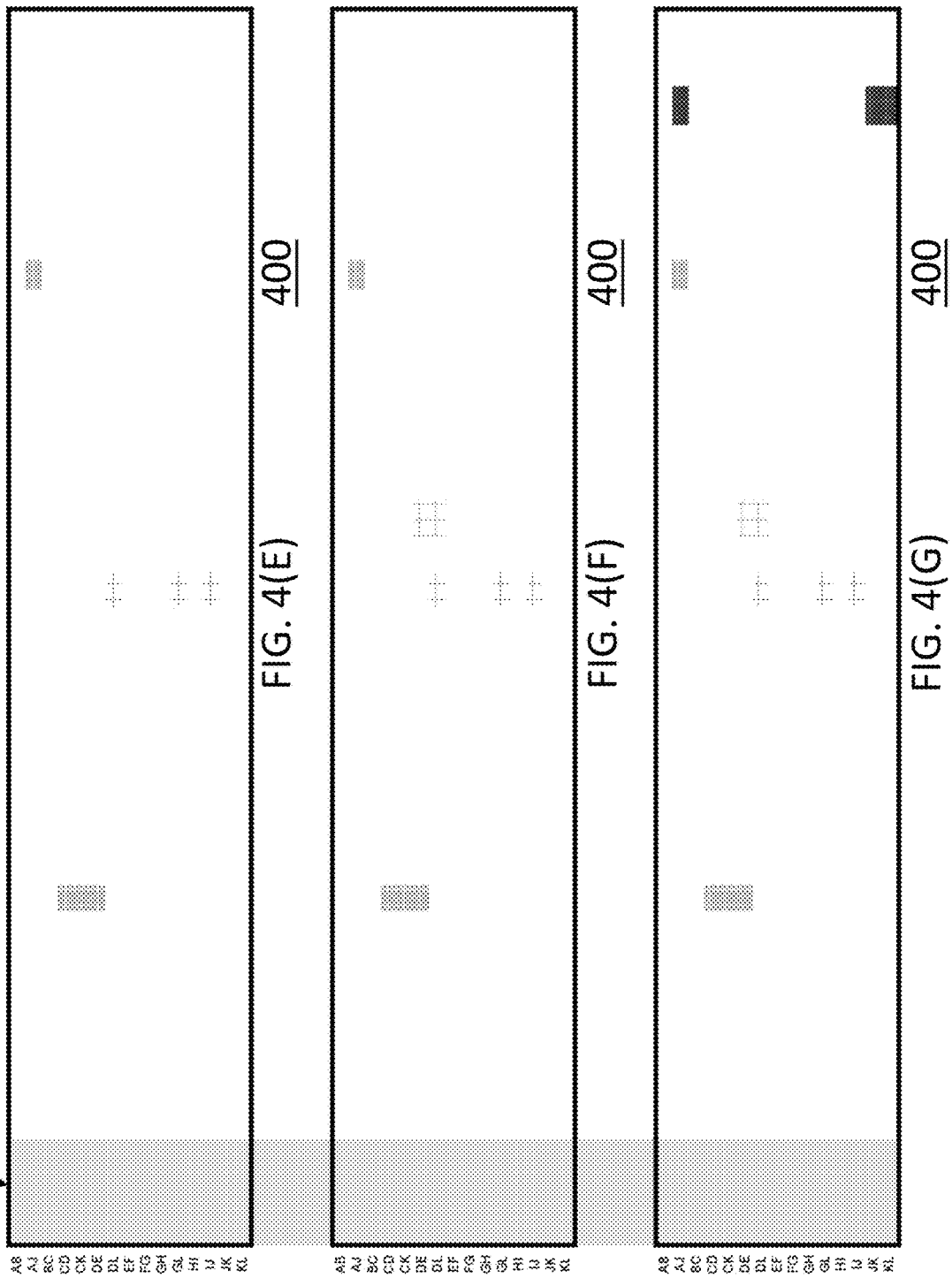

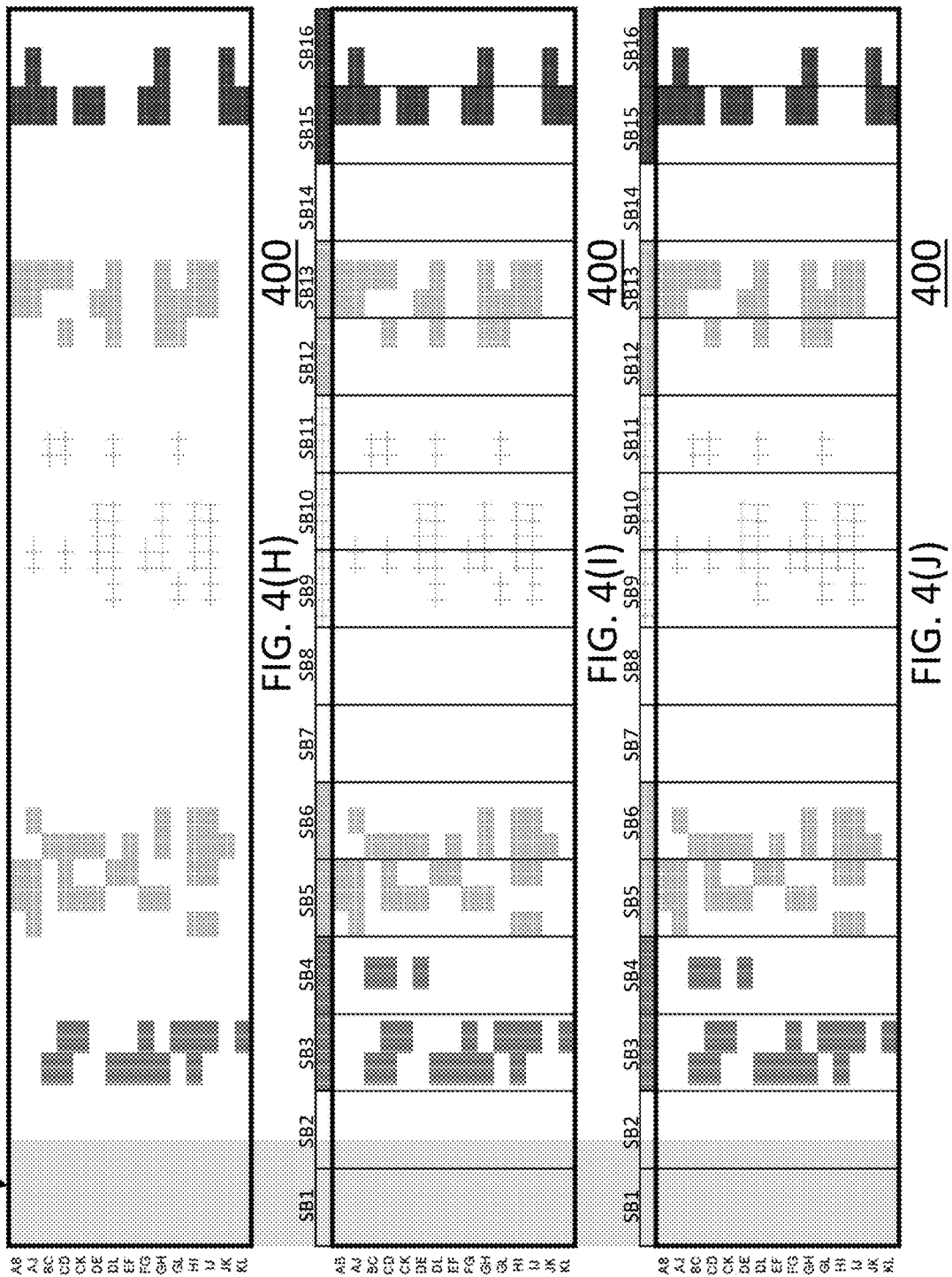

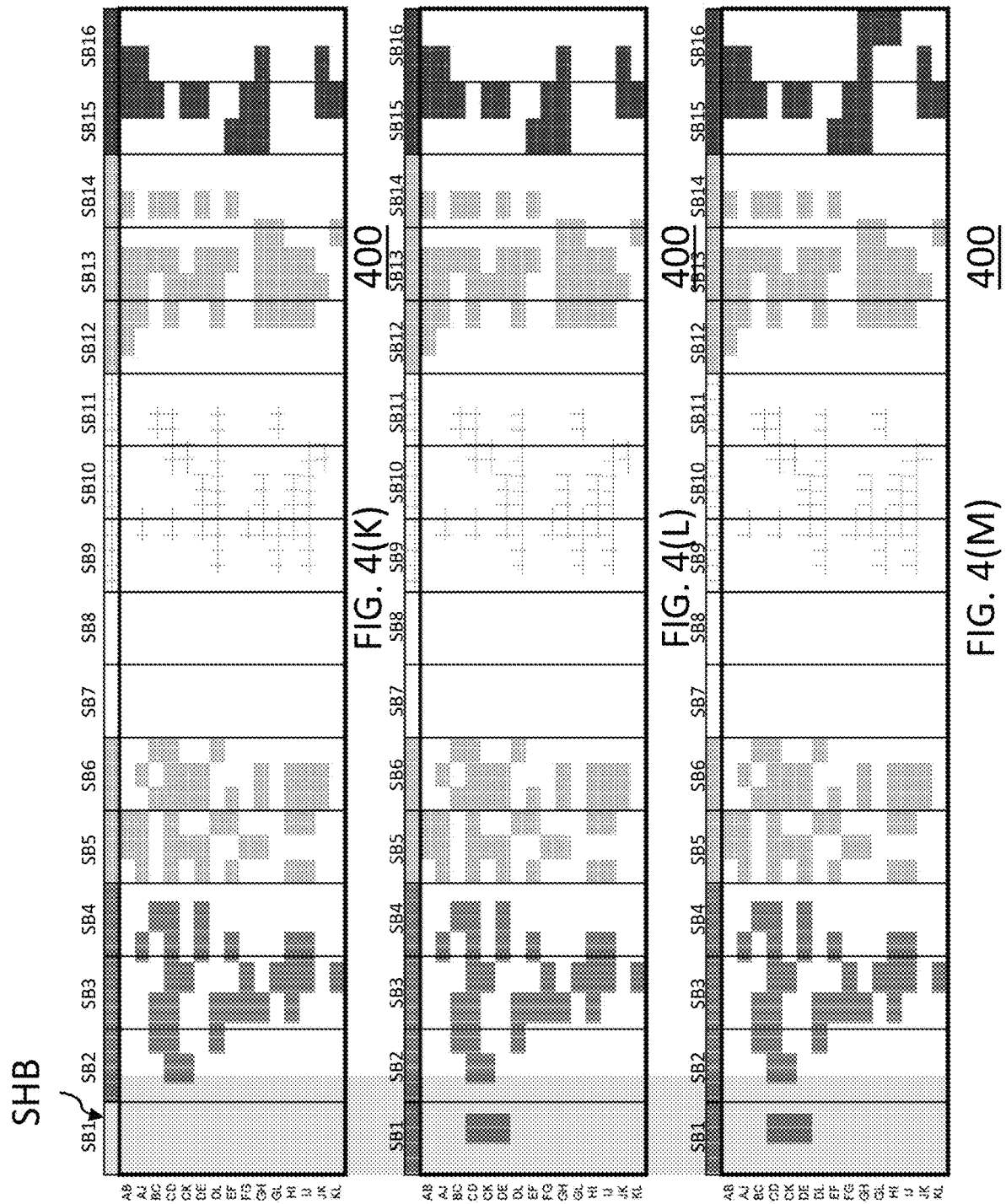

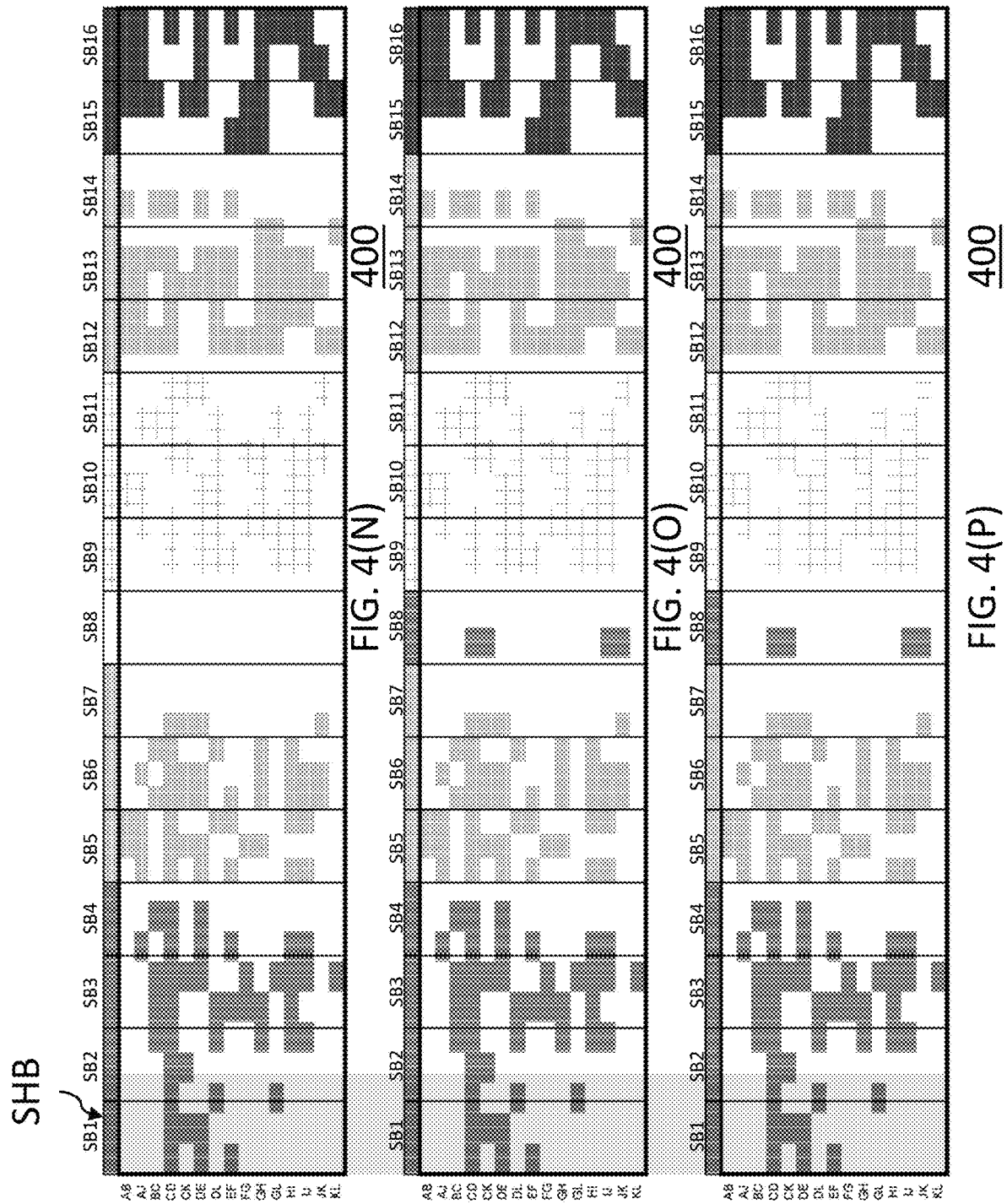

```
1   // populate spectrum with fake 12.5GHz curve to define SHB-exclusion zone
2   Initiate spectrum(1,wlg) with spectrum of SHB
3   Initiate gauss_cost(1,wlg) with values defined by gaussian cost function
4   // gaussian cost function (wlg)= EXP(-((0.01* wlg)^2)), where EXP is the exponential e
5
6   Initialize Loading_Plan_cost with -1000 // fill empty elements to -1000 to exclude them
7   For grid_id = 1 to grid_max
8   //grid_max= the highest considered channel spacing/12.5GHz
9       // abstract the vector corresponding to selected grid_id
10      spectrum_tmp = Application.Index(spectrum, grid_id)
11      cost(for any wlg) = prodconv(spectrum_tmp, gauss_cost)
12      For g_id = 1 to grid_max
13          if grid_id = g_id then attractive_cost = 1 else attractive_cost = -1
14          For each allowed wlg for grid g_id
15              increment the Loading_Plan_cost (g_id,wlg) with attractive_cost * cost(wlg)
16              Next wlg
17          Next g_id
18  Next grid_id
19
20  For grid_id = 1 to grid_max
21      Sort the LoadingPlan following the Loading_Plan_cost in decreasing order
22  Next grid_id
```

FIG. 5

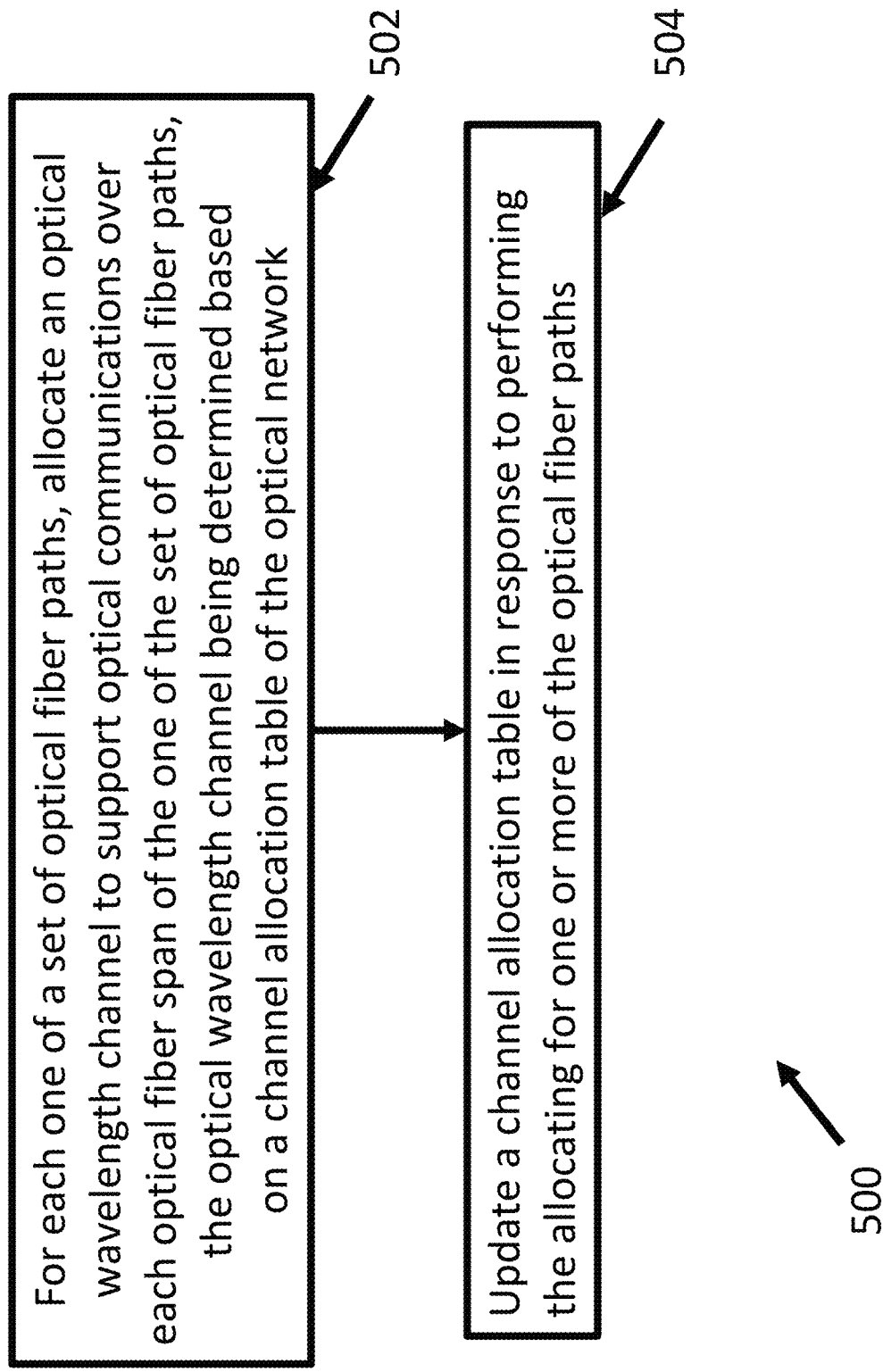

ADAPTIVE CHANNEL LOADING IN WDM OPTICAL COMMUNICATION SYSTEMS

CROSS REFERENCE TO RELATED APPLICATIONS

This application claims priority to European Patent Office application Number EP21192102.8, "ADAPTIVE CHANNEL LOADING IN WDM OPTICAL COMMUNICATION SYSTEMS", filed by Nokia Solutions and Networks Oy on Aug. 19, 2021, and listing inventors Arnaud Bisson, Milosav Andelic, Giovanni Bellotti, and Eliana Vercelli.

BACKGROUND

Field of the Disclosure

The present disclosure relates to optical communication systems that employ wavelength division multiplexing (WDM).

Description of the Related Art

This section introduces aspects that may help facilitate a better understanding of the disclosure. Accordingly, the statements of this section are to be read in this light and are not to be understood as admissions about what is prior art or what is not prior art.

In an optical communication system that employs dense wavelength division multiplexing (WDM), such as those that conform to the ITU-T G.694.1 recommendation, which is incorporated herein by reference in its entirety, the available optical spectrum is divided into a frequency grid comprising multiple, contiguous, non-overlapping frequency slots (also known as spectrum slots) having the same width in the frequency domain.

A typical WDM optical communication system comprises multiple optical nodes interconnected by an optical mesh network of optical fibers, wherein some of the optical nodes may be interconnected by all-optical amplifier. When optical signals are transmitted from a source optical node to a destination optical node in such a WDM system, the optical signals are transmitted from the transmitting optical node to the receiving optical node over a sequence of one or more optical fiber spans, which may or may not have an all-optical amplifier thereon. Here, the portion of the fiber transmission path connecting the one optical node to the sequentially next optical node of an optical fiber path may be referred to as one hop. At a given time, the optical mesh network of a typical WDM optical system may support multiple optical paths, where each optical path is allocated the same or different optical wavelength channels, i.e., for the different optical fiber spans of the path. On each optical fiber span, the various optical channels have wavelength channel widths (i.e., width in the frequency domain) that are an integer number of contiguous frequency slots. In a WDM system, one optical fiber span may support various optical wavelength channels with the same or different optical wavelength channel widths.

If WDM wavelength channels are allocated in a way that causes significant spectrum fragmentation, such an allocation may interfere with full use of remaining portions of the spectrum for optical wavelength channel allocation. One technique for mitigating spectrum fragmentation includes dividing the spectrum into fixed, equal-sized, contiguous, non-overlapping, spectral sub-bands for allocation of optical wavelength channels. Each such sub-band (SB) includes a portion of the spectrum for allocating optical wavelength channels of a single wavelength channel width. Another technique for mitigating spectrum fragmentation allocates channels of a first channel width starting at one end of the spectrum and allocates channels of a second, different channel width starting at the other end of the spectrum. These techniques may work when there are only two different channel widths, but are less likely to minimize spectral fragmentation when there are more than two different channel widths.

SUMMARY OF ILLUSTRATIVE EMBODIMENTS

An optical WDM system may be configured to preferentially impose spectrum continuity and spectrum contiguity on allocated optical paths. Optical spectrum continuity refers to the same wavelength channel being used for each hop, or each optical fiber span, of a given optical path. Optical spectrum contiguity refers to optical wavelength channels being allocated such that available neighbor each other, e.g., to increase the ability of use of the remaining optical spectrum for allocations of new optical wavelength channels. In the frequency domain, two frequency slots neighbor each other if they correspond to the same optical fiber span and are contiguous in the frequency domain. In the spatial domain, two allocated frequency slots neighbor each other if they have the same frequency range and are contiguous in the same optical fiber span. Herein, various embodiments may provide improvements to lowering spectral fragment while improving WDM spectral continuity and contiguity.

Various embodiments implement an adaptive wavelength allocation algorithm in a WDM optical network. Some such embodiments preferentially group together allocations of optical wavelength channels with the same width and largely separate allocations of optical wavelength channels with different widths. Such grouping schemes may lower spectrum fragmentation and may maintain more flexibility than schemes based on allocating optical wavelength channels to preselected rigid set of optical sub-bands.

Some implementations may define spectral sub-bands after the predetermined available optical spectrum has been sufficiently populated by optical wavelength channel allocations and then, define a set of sub-bands of a suitable spectral size to cover a substantial part of said optical spectrum. The use of such a set of optical sub-bands for future allocations of optical wavelength channels adjacent spectral regions for optical wavelength channels of different width to be separated by empty optical regions that are too narrow for future allocations of optical wavelength channels, i.e., lost parts of the optical spectrum with respect to future allocations. In various implementations, the allocation of the available optical spectrum for optical wavelength channels may initially be allowed to proceed without imposing a rigid grid for such allocations and then, may be changed in response to the optical spectrum having a significant density of such allocations. In response to a predefined density of such allocations, a grid of optical sub-bands of suitable spectral width(s) may be defined on the optical spectrum to control future allocations in a manner than can reduce spectral fragmentation and/or the creation of narrow regions of the optical spectrum that are unavailable for future allocations of optical wavelength channels.

Embodiments of a first method include, for each one of a plurality of optical fiber paths in an optical network, allocating an optical wavelength channel in an optical spectrum such that the allocated optical wavelength channel is assigned to one of a plurality of optical fiber paths on each optical fiber span thereof. The method also includes updating a channel allocation table in response to performing the allocating for one or more of the optical fibers paths. The channel allocation table indicates optical wavelength channels allocated to the optical fiber spans of the optical network. The act of allocating includes determining the optical wavelength channel to be allocated based on a state of the optical network as defined by the channel allocation table.

In some embodiments of the first method, the channel allocation table may include indications of widths of the optical wavelength channel allocated to the optical fiber spans, and the allocating may cause at least a first of the optical fiber paths and a second of the optical fiber paths to be allocated optical wavelength channels of different widths.

In any of the above embodiments, the first method may further include for at least a particular one of the optical fiber paths, deallocating a particular one of the optical wavelength channels previously allocated thereto and updating the channel allocation table to indicate that the particular one of the optical wavelength channels is not allocated to one of the optical fiber spans of the optical network.

In any of the above embodiments of the first method, the method may further include defining a set of optical sub-bands to cover a part of the optical spectrum in response to a state of the channel allocation table satisfying a fullness property. The optical sub-bands are defined such that each of the allocated optical wavelength channels is located in one of the optical sub-bands. In some such embodiments, in response to the definition of the set of optical sub-bands, the method may further include allocating a second optical wavelength channel to support optical communications over each optical fiber span of a further optical fiber path such that the second optical wavelength channel is in one of the optical sub-bands. In any embodiments of this paragraph, the allocating at least a second optical wavelength channel may include allocating said second optical wavelength channel to be at an edge of the one of the defined optical sub-bands or to be next to another allocated optical wavelength channel in the one of the defined optical sub-bands. That is, the allocated optical wavelength channels may be packed to be adjacent to each other in individual ones of the optical sub-bands from one edge thereof. Such adjacent packing of allocated optical wavelength channels may be such that adjacent ones of the optical wavelength channels overlap at magnitude values that are less than one of 2.5 deci-Bells (bB), 3 dB, 3.5 dB, 4 dB, 4.5 dB, and 5 dB of their peak magnitude values.

In some embodiments of this paragraph, in response to the definition of the set of optical sub-bands, the method may include allocating optical wavelength channels, in at least one of the optical sub-bands, to have a minimal width for optical wavelength channels in the at least one of the optical sub-bands and to have an integer multiple of the minimal width, wherein the integer is two or more. In some embodiments of this paragraph, the allocating a second one of the optical channels may allocate optical wavelength channels of a same minimal width to one or more of the optical sub-bands.

In other embodiments, a first apparatus includes a channel allocation controller capable of communicating with optical nodes of an optical network. For each one of a plurality of optical fiber paths between a pair of the nodes, the channel allocation controller is capable of allocating an optical wavelength channel in an optical spectrum to support optical communications between the pair of optical nodes over the one of the plurality of optical fiber paths on each optical fiber span thereof. The channel allocation controller is configured to update a channel allocation table in response to allocating the optical wavelength channel. The channel allocation table indicates those of the optical wavelength channels allocated over the optical fiber spans of the optical network. The channel allocation controller is configured to determine to allocate one of the optical wavelength channels based on a state of the optical network as defined by the allocation table.

In any embodiments of the above first apparatus, the channel allocation controller may be configured to deallocate a particular one of the optical fiber paths by updating the channel allocation table to not indicate allocation of an optical wavelength channel previously allocated to an optical fiber span of the particular one of the optical fiber paths.

In any embodiments of the above first apparatus, the channel allocation controller may be configured to write to the allocation table an indication of widths of the optical wavelength channels allocated to the optical fiber spans. Also, the channel allocation controller may be capable of allocating at least to a first optical fiber path of the optical network an optical wavelength channel of a different width than an optical wavelength channel already allocated to a second optical fiber path of the optical fiber network.

In any embodiments of the first apparatus, the channel allocation controller may be configured to define a set of optical sub-bands to cover a part of the optical spectrum in response to a state of the allocation table satisfying a fullness property. The optical sub-bands are defined such that each of the allocated wavelength channels is located in one of the optical sub-bands. In some such embodiments, in response to the definition of the set of optical sub-bands, the channel allocation controller may be configured to allocate at least a second optical wavelength channel to support optical communications over each optical fiber span of a second optical fiber path such that the second optical wavelength channel is in one of the defined optical sub-bands. In such embodiments, the channel allocation controller may be configured to allocate the at least a second optical wavelength channel to be at an edge of the one of the defined optical sub-bands or to be next to another allocated wavelength channel in the one of the defined optical sub-bands, e.g., for each optical fiber span of the second optical fiber path. That is, the channel allocation may be done so that allocated optical wavelength channels are next to each other in the one of the defined optical sub-bands from one edge thereof. Such adjacent packing of allocated optical wavelength channels may be such that adjacent ones of the optical wavelength channels overlap at magnitude values that are less than one of 2.5 deci-Bells (bB), 3 dB, 3.5 dB, 4 dB, 4.5 dB, and 5 dB of their peak magnitude values.

In some embodiments of the this paragraph, in response to the definition of the set of optical sub-bands, the channel allocation controller may be configured to allocate different width optical wavelength channels, to one or more of the optical sub-bands. For an individual one of the one or more optical sub-bands, the different widths of the optical wavelength channels allocated therein may be integer multiples of a minimal width for optical wavelength channels allocated to the individual one of the one or more optical sub-bands, wherein the integer may be 1, 2, 3, 4, 5, etc.

A second method includes, in response to each request of a first plurality for a communication channel between a pair of optical nodes of an optical fiber network, allocating a first optical wavelength channel to an optical fiber path connecting the pair based on a state of the optical fiber network. The second method also includes defining a set of optical sub-bands to cover a predetermined spectral region in response to a density of the allocated optical wavelength channels in the spectral region being determined to be greater than a threshold. Each of the allocated optical wavelength channels is contained in one of the optical sub-bands. The second method includes, in response to the defining, allocating at least a second optical wavelength channel to an optical fiber path connecting a second pair of optical nodes such that the second optical wavelength channel is contained in one of the optical sub-bands for each request of a second plurality or requests for a communication channel between a second pair of the optical nodes. Each one of the optical sub-bands has a size enabling allocation therein of a plurality of adjacent wavelength channels of one or more widths.

In any embodiments of the above second method, each act of allocating in response to the defining, may allocate one of the optical wavelength channels to be adjacent to an edge of one of the optical sub-bands or to be adjacent to another optical wavelength channel allocated to the one of the optical sub-bands. That is, the allocated optical wavelength channels may be packed to be adjacent to each other in individual ones of the optical sub-bands from one edge thereof. Such adjacent packing of allocated optical wavelength channels may be such that adjacent ones of the optical wavelength channels overlap at magnitude values that are less than one of 2.5 bB, 3 dB, 3.5 dB, 4 dB, 4.5 dB, and 5 dB of their peak magnitude values.

In any embodiments of the above second method, the act of allocating, for each request of the first plurality, may include determining whether the density is greater than the threshold, e.g., a fullness threshold, and individually allocating one of the first optical wavelength channels to an optical fiber path of the optical network in response to determining that the density not greater than the threshold.

In any embodiments of the above second method, different ones of the optical sub-bands may have a same first size.

In any embodiments of the above second method, some of said optical sub-bands may have a different second size.

In any embodiments of the above second method, the acts of allocating a second optical wavelength channel may involve allocating optical wavelength channels of different widths to different ones of the optical sub-bands.

In any embodiments of the second method, the defining of optical sub-bands may include defining said optical sub-bands to be of equal size except optionally the optical sub-band at one or both sides of the spectral region for allocation. The size of individual optical sub-bands may be predetermined or may be computed based criteria such as the initial fullness of optical sub-bands with allocated optical wavelength channels, the set of possible of optical wavelength channel widths, the reduction of a presence of optical wavelength channels of different widths in the same optical sub-band, and/or the reduction of occurrences of already allocated optical wavelength channels overlapping two optical sub-bands. Some embodiments may define the optical sub-bands of equal size to have a minimal size based the available widths for optical wavelength channels. Such a minimal size would fit an integer number any of the available optical wavelength channel widths, wherein one such integer is greater than one.

In any embodiments of the second method, the defining the set of optical sub-bands may be triggered by an average spacing between already allocated optical wavelength channels being of order of a predetermined or estimated size for the optical sub-bands of equal size. For example, said triggering may be responsive to the average spacing between already allocated optical wavelength channels being any of 10, 5, 3, 2, or 1 times such predetermined or estimated size. Alternatively, the triggering may be responsive to the one or more of the distances between areas already allocated to different optical wavelength channel widths becoming of order of such a predetermined or estimated optical sub-band size, e.g., 1, 2, 3, 4, 5, or even 10 times said size. As an example, the triggering may occur in response to only one candidate for the optical sub-band size remaining available.

A second apparatus includes a channel allocation controller to communicate with optical nodes of an optical network. The channel allocation controller is configured, in response to each receipt of a request of a first plurality for a communication channel between a pair of the optical nodes, to allocate a first optical wavelength channel to an optical fiber path connecting the pair based on a state of an optical fiber network. The channel allocation controller is configured to define a set of optical sub-bands to cover a spectral region in response to a density of the allocated optical wavelength channels being greater than a threshold, wherein each allocated optical wavelength channel is contained in one of the defined optical sub-bands. Responsive to the defining, the channel allocation controller is configured, for each request of a second plurality for a communication channel between a second pair of the optical nodes, to allocate a second optical wavelength channel to an optical fiber path connecting the second pair such that the second optical wavelength channel is contained in one of the optical sub-bands. Here, each of the optical sub-bands has a size enabling allocation therein of a plurality of adjacent wavelength channels of one or more widths.

In any embodiments of the above second apparatus, the channel allocation controller may be configured to allocate each second optical wavelength channel to be adjacent to an edge of one of the optical sub-bands or to be adjacent to another optical wavelength channel allocated to the same one of the optical sub-bands. That is, the allocated optical wavelength channels may be packed to be adjacent to each other in individual ones of the optical sub-bands from one edge thereof. Such adjacent packing of allocated optical wavelength channels may be such that adjacent ones of the optical wavelength channels overlap at magnitude values that are less than one of 2.5 bB, 3 dB, 3.5 dB, 4 dB, 4.5, and 5 dB of their peak magnitude values.

In any embodiments of the above second apparatus, the channel allocation controller may be configured, for each request of the first plurality, to determine whether the density is greater than the threshold and to individually allocate one of the first optical wavelength channels in response the density being not being greater than the threshold.

In any embodiments of the above second apparatus, different ones of the optical sub-bands may have a same first width.

In any embodiments of the above second apparatus, the channel allocation controller may be configured to allocate optical wavelength channels of different widths to one or more of the optical sub-bands. In any such embodiments, the channel allocation controller may be configured to allocate, to an individual one of the one or more of the optical sub-bands, optical wavelength channels that are an integer multiple of a minimum width for optical wavelength channels allocated to the individual one of the one or more optical wavelength channels, e.g., the integer may be 1, 2, 3, 4, 5, etc.

In any above embodiments of the second apparatus, the defining of optical sub-bands may include defining said optical sub-bands to be of equal size except optionally the optical sub-band at one or both sides of the spectral region for allocation. The size of individual optical sub-bands may be predetermined or may be computed based criteria such as the initial fullness of optical sub-bands with allocated optical wavelength channels, possible of optical wavelength channel widths, reduction of a presence of optical wavelength channels of different widths in the same optical sub-band, and/or reduction of occurrences of already allocated optical wavelength channels overlapping two optical sub-bands. Some embodiments may define the optical sub-bands of equal size to have a minimal size based the available widths of optical wavelength channels. Such a minimal size would fit an integer number any of the available optical wavelength channel widths, wherein one such integer is greater than one.

In any above embodiments of the second apparatus, the defining the set of optical sub-bands may be triggered by an average spacing between already allocated optical wavelength channels being of order of a predetermined or estimated size for the optical sub-bands of equal size. For example, said triggering may be responsive to the average spacing between already allocated optical wavelength channels being any of 10, 5, 3, 2, or 1 times such predetermined or estimated size. Alternatively, the triggering may be responsive to the one or more of the distances between areas already allocated to different optical wavelength channel widths becoming of order of such a predetermined or estimated optical sub-band size, e.g., 1, 2, 3, 4, 5, or even 10 times said size. As an example, the triggering may occur in response to only one candidate for the optical sub-band size remaining available.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 4(B)-4(Q) are graphical representations of an example of a channel allocation table, at different specific times as the optical spectrum of FIG. 4(A) becomes populated with allocated channels for optical paths in the mesh network of FIG. 3 according to one possible example sequence of adding new optical paths using the adaptive wavelength allocation algorithm of FIG. 1;

FIG. 5 shows pseudocode for one possible implementation of the process of updating the loading plan shown in steps 102-106 of FIG. 1.

FIG. 6 illustrates a method of allocating optical wavelength channels in an optical network, e.g. as in FIG. 3, based on use of an updatable channel allocation table, e.g., as illustrated in FIGS. 4A-4Q.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Optical wavelength channels may be allocated in a way that increases spectrum fragmentation thereby potentially reducing the availability of remaining portions of the preset spectrum for further optical wavelength channel allocation. One technique for mitigating such spectrum fragmentation involves dividing the spectrum into fixed spectral sub-bands, e.g., equal-size sub-bands, so that wavelength channels are allocated from such fixed sub-bands. Another technique for mitigating spectrum fragmentation involves allocating wavelength channels of one width from one end of the spectrum and allocating wavelength channels of a different width from the other end of the spectrum. Here, some embodiments improve wavelength channel allocation, e.g., by lowering spectral fragmentation, e.g., where channel allocation with more than two or more optical wavelength channel widths. Some such embodiments may increase usage of the optical spectrum by better compliance with spectral continuity and/or contiguity constraints.

Figure 1:
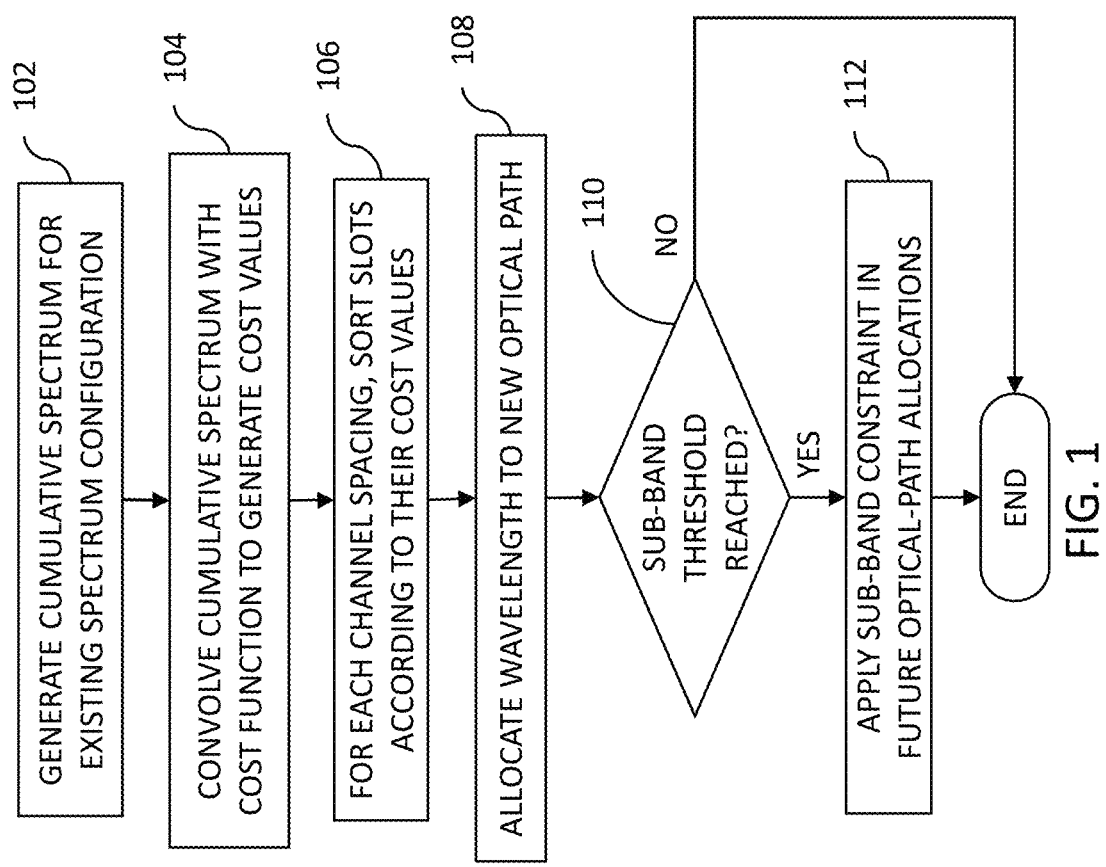
FIG. 1 is a flow diagram of an adaptive wavelength allocation algorithm for allocating adjacent frequency slots to new optical paths in a WDM optical communication system, according to certain embodiments of the disclosure.

FIG. 1 is a flow diagram of an adaptive wavelength allocation algorithm for allocating adjacent frequency slots to new optical paths in a WDM optical communication system, according to certain embodiments of the disclosure. The algorithm may, e.g., apply a cost function to a representation of the existing spectrum allocation for each channel width to generate a cost value for each frequency slot with respect to each of the plurality of different channel widths supported by the WDM system. The algorithm may then, use such cost values to allocate a particular optical channel for a new optical path in the system.

In an example implementation, a WDM system has a 4.750 THz optical spectrum that is divided into 384 12.5 GHz frequency slots f1 to f384, where the supported channel widths are 50 GHz, 62.5 GHz, 75 GHz, and 100 GHz. In that case, each 50 GHz channel is formed of four contiguous 12.5 GHz frequency slots, each 62.5 GHz channel is formed of five contiguous 12.5 GHz frequency slots, each 75 GHz channel is formed of six contiguous 12.5 GHz frequency slots, and each 100 GHz channel is formed of eight contiguous 12.5 GHz frequency slots. Other implementations may use different numbers of frequency slots, frequency slots of a different size, different supported wavelength channel widths, and/or different numbers of supported channel widths.

The example algorithm of FIG. 1 is divided into two phases: in the first phase (e.g., steps 102-106), the algorithm computes an adaptive loading plan from the existing spectrum configuration, and, in the second phase (e.g., steps 108-112), the algorithm applies the adaptive loading plan from the first phase to allocate a new optical path.

In step 102 of FIG. 1, an indication of wavelength channel allocations for a pre-determined spectrum is generated. For each frequency slot in the spectrum, the tabulation may, e.g., include the number of existing channel allocations over various optical fibers in the mesh network may be generating, e.g., including information on the widths of the allocated wavelength channels. For example, if 15 different fibers in the network have frequency slice f17 assigned to 50 GHz channels, then the indication may show a value of 15 to indicate the number of times the frequency slice f17 and the 50 GHz channel width were allocated. If that same frequency slice f17 is allocated in seven different fibers in the network assigned to 62.5 GHz channels, then the tabulation may indicate a value of 7 for the number of times that frequency slice f17 and the 62.5 GHz channel width were allocated. The indication may include similar entries for various channel widths and frequency slices that have been allocated.

In step 104, the indication for the spectrum allocations may be convolved with a suitable cost function to generate a cost value for different frequency slice and different channel width. The cost function is selected to produce cost values that indicate the suitability for the corresponding frequency slice to be used in a newly provisioned optical path with the corresponding channel width. For example, a suitable gaussian cost function may produce a positive number having a relatively large magnitude that indicates that the corresponding frequency slice is very suitable for use in a new optical path with the corresponding channel width, while producing a negative number having a relatively large magnitude that indicates that that frequency slice is not suitable for use in the new optical path with a different corresponding channel width. Those skilled in the art will understand that suitable cost functions generate suitable cost values that distinguish between different channel widths in an appropriate manner and are not limited to cost functions that generate relatively high positive values for suitable channel widths and relatively low negative values for unsuitable channel widths.

Figure 2:
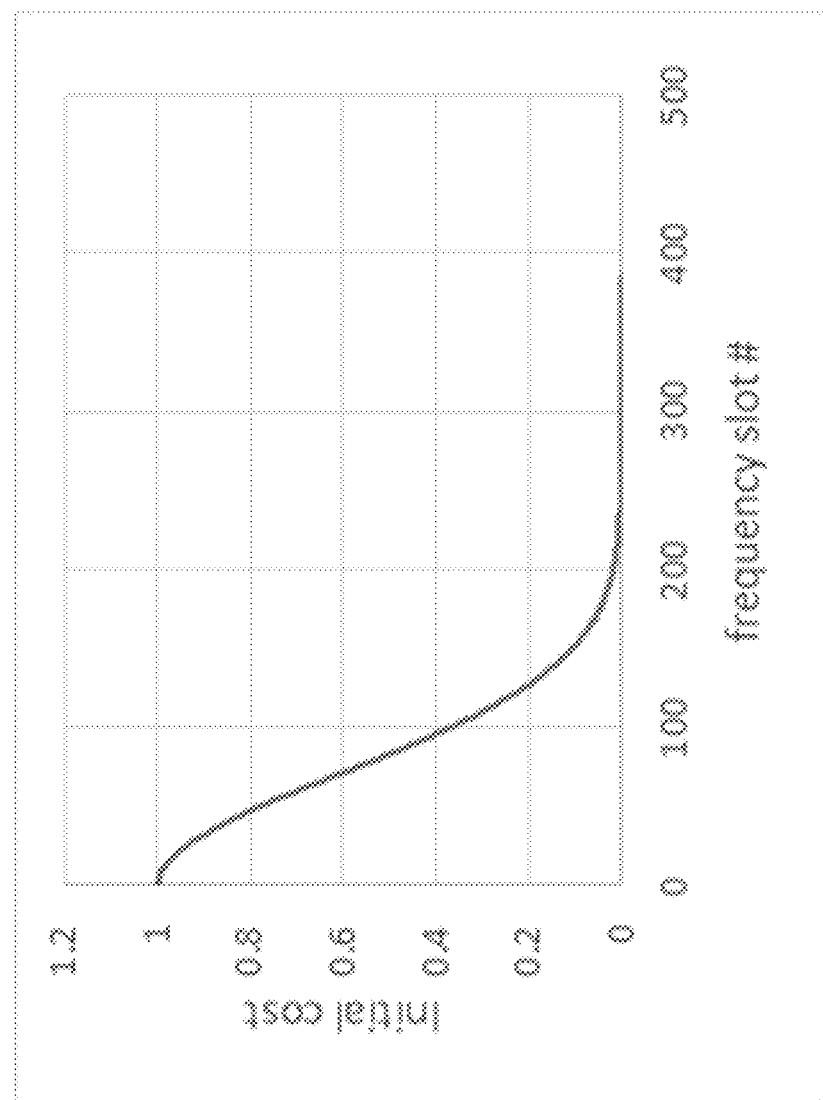
FIG. 2 is a graphical representation of a suitable gaussian function that can be used to generate cost values for the current state of the frequency slots in a WDM system having 384 slots, where the initial cost value for frequency slot n is $EXP(-((0.01*n)^2))$, where EXP is the exponential e.

FIG. 2 is a graphical representation of a suitable gaussian function that can be used to generate cost values for the current state of the frequency slots in a WDM system having 384 slots, where the initial cost value for frequency slot n is $EXP(-((0.01*n)^2))$, where EXP is the exponential e. Note that, when the gaussian function of FIG. 2 and the indication spectral allocations are both arrays of discrete values, the gaussian function's array can be convolved with the array for the indication of spectral allocations, where the arrays are treated as circular such that the gaussian function's array wraps around the array for the indication of spectral allocations as needed as the two arrays are convolved.

When computing the cost values for a particular channel width, the convolution results for the other channel widths are subtracted from the convolution results for the particular channel width. As a result, for a spectral region where the particular channel width already has existing allocated channels and the other channel widths do not, the resulting cost values for those frequency slots will be positive values, indicating that it is desirable to allocate the channel for the new optical path in that same spectral region. On the other hand, for a spectral region where the particular channel width has few if any existing allocated channels and at least one other channel width has existing allocated channels, the resulting cost values for those frequency slots will be negative values, indicating that it is undesirable to allocate the channel for the new optical path in that same spectral region.

Referring again to FIG. 1, in step 106, for each channel width, the frequency slots are sorted according to their cost values to generate a loading plan for each channel width.

In step 108, the sorted cost values in the loading plan generated in step 106 corresponding to the desired channel width are used to select a particular set of contiguous frequency slots to be used for the new optical path. Typically, the loading plan is configured to satisfy the contiguity constraint so that the same set of frequency slots are used for all hops, or fiber spans, of the new optical path. Typically, the set of frequency slots (corresponding to the desired channel width) with the highest cost values that satisfies the contiguity constraint is selected as channel for the new optical path. The cost function is designed such that optical paths of the same channel width are preferably assigned to the same general region of the spectrum. Thus, in the above example, a new 50 GHz wide, wavelength channel is preferably allocated near existing 50 GHz wide, wavelength channels using the 50 GHz loading plan, a new 62.5 GHz wide, wavelength channel is preferably allocated near existing 62.5 GHz wide, channels using the 62.5 GHz loading plan, and so on. This may be achieved by generating, e.g., relatively high, positive cost values for the 50 GHz wavelength channel width for frequency slots that are already allocated to 50 GHz channels and/or are near other frequency slots that are already allocated to 50 GHz wide, wavelength channels, while generating relatively low, negative cost values for the 62.5 GHz wavelength channel width, the 75 GHz wavelength channel width, and the 100 GHz wavelength channel width for those same frequency slots, and analogously for cost values for the other wavelength channel widths.

Note that the allocation of frequency slots may consider certain physical characteristics of the optical fiber spans and/or the optical nodes of the optical mesh network. For example, some optical lasers used in optical nodes are susceptible to a phenomenon referred to as spectral hole burning (SHB), such that allocation of the lowest frequency slots in the optical spectrum, for optical wavelength channels, is preferably deferred until after a sufficient number and/or distribution of higher frequency slots have been allocated. In some implementations, the algorithm can be guided to defer initial allocation of those low frequency slots by pre-populating the cost function values for those frequency slots with relatively low values. Other physical characteristics that make certain frequency slots more or less suitable for certain optical wavelength channel allocations under certain circumstances can be handled in a similar or analogous manner.

In a typical mesh network, there are often multiple possible optical paths between any two nodes. When provisioning a mesh network for a new communication between two specific optical nodes, certain implementations of the disclosure may first identify a particular optical path between the two optical nodes using a conventional optical routing technique and then attempt to find a set of suitable frequency slots along that optical path that can support the communication. If the selected optical path cannot support the communication with an appropriate set of frequency slots, then the algorithm can select another optical path and try to find suitable frequency slots for the communication along that other optical path. This process can be repeated until a suitable optical path is found. Other implementations may employ other techniques, such as those that first identify suitable frequency slots and then determine which fibers having those suitable frequency slots available form complete optical paths between the two nodes.

By implementing steps 102-108 from an initial allocation of an optical path in the network, the algorithm may tend to group the 50 GHz wide, wavelength channels together in a first region of the spectrum, to group the 62.5 GHz wide, wavelength channels together in a second, non-overlapping region of the spectrum, and so on for each supported wavelength channel width. The initial allocations of optical paths having different wavelength channel widths will be relatively far from one another across the frequency spectrum, but, as more and more optical wavelength channels are allocated, the widths of the spectral regions having allocations of different wavelength channel width will continue to grow. At some point, the some of the regions of contiguous wavelength channel allocations of a single wavelength channel width may become close to each other. As an example, some such regions may become so close that portion(s) of the spectrum between neighboring such regions is(are) unavailable for optical wavelength channel allocation. For example, some such parts of the spectrum may be too narrow for channel allocation.

In order to avoid or reduce the occurrence of the above-described undesirable situations, various embodiments may provide for different methods for wavelength channel allocation in response to the spectrum allocation reaching a certain level of fullness. In certain such implementations, the allocation method includes one or more steps of defining specific non-overlapping sub-bands of the spectrum for further allocations of wavelength channels. For example, the method may include writing a table or list of sub-bands, which also indicates allocated and/or non-allocated spectral regions in individual ones of the sub-bands. Individual ones of such sub-bands may be designated for allocations of one or more fixed wavelength channel widths.

For example, all or part of the spectrum may be assigned to said sub-bands. That is, each part of the available spectrum may be initially assigned to one of the sub-bands or only a portion of the available spectrum may be so assigned. In some embodiments, new non-overlapping sub-bands may be defined for remaining parts of the available spectrum later.

Also, the different sub-bands may have the same width or different widths.

After such a table or list of sub-bands has been made, subsequent or future wavelength channel allocations are made based on said set of sub-bands and the wavelength channel widths designations thereof. In an individual sub-band, such future wavelength channel allocations may be made such that allocated wavelength-channels are contiguous or neighboring, e.g., to reduce the occurrence of non-allocatable wavelength regions therein.

In some embodiments, each individual sub-bands may be defined to have a size and/or spectral location such that existing wavelength channel allocations therein have the same channel width. Subsequent, wavelength channel locations in one of the spectral sub-bands may have the same width and/or may have different widths. For example, an individual spectral sub-band may be configured to support wavelength channels whose widths are integer multiples of a minimal width, wherein the size of the individual sub-band is an integer multiple of said minimal width. In such a case, allocations of wavelength channels of said minimal width would be capable of filling the entire sub-band so that available spectrum therein is not blocked from use for some future allocation of wavelength channel(s).

In order to be flexible, because the number and distribution of channel allocations is not known a priori, the assignment of spectral sub-bands may be delayed in various embodiments. On the other hand, definition of such spectral sub-bands typically should not be delays so much that need to be their definition or assignments would not enable existing channel allocations to fit therein is a manner efficient for spectral usage.

The sequence of sub-bands may be, but do not need to be, defined starting at one end of the predefined spectrum, i.e., in a contiguous manner. Alternatively, the locations of the sub-bands may be selected as needed to satisfy the sub-band constraint that already allocated wavelength channels fit suitably therein. As such, in typical implementations, there may be one or more frequency slots to the left of the first full sub-band and/or one or more frequency slots to the right of the last full sub-band. In some implementations, the sub-band constraint may be applied within those partial sub-bands, such that channels of the same channel width may allocated within each of those partial sub-bands, which may be the same as or different from the channel width of the adjacent full sub-band.

According to step 110, after optical wavelength channels for a new optical path are allocated, the method may include determining whether to define a set of sub-bands for use in future optical-path channel allocations. This determination may include identifying a suitable sub-band size based on the already allocated spectrum configuration, e.g. to ensure the identified sub-band size is implementable, e.g., subject to the above-discussed sub-band constraints. The determination may also include evaluating whether to delay definition of a set of sub-bands, to a future time, or make said definitions in response to this allocation of optical wavelength channels to the new optical path. Often, to provide greater flexibility, smaller sub-band sizes are preferable to larger sub-band sizes. Depending on the particular implementation, one or more of the following criteria may be taken into account in determining sub-band size and sub-band locations:

The number and sizes of the different channel widths;
Minimization (or avoidance) of multiple different channel widths within a single sub-band;
Minimization (or avoidance) of channels overlapping two adjacent sub-bands; and
Preference for smaller sub-bands.

In some implementations, the sub-band size may be selected based on the sizes for wavelength channels and the number of different sized. Preferable sub-band sizes for 50 GHz channels are integer multiples of 50 GHz (i.e., 50 GHz, 100 GHz, 150 GHz, etc.), while preferable sub-band sizes for 62.5 GHz channels are integer multiples of 62.5 GHz (i.e., 62.5 GHz, 125 GHz, 187.5 GHz, etc.). Using a sub-band width of 187.5 GHz for a WDM system having both 50

GHz channels and 62.5 GHz channels may result in wasted capacity due to the inability to completely fill up those 187.5 GHz sub-bands designated for 50 GHz channels. In some implementations, an optimal sub-band size is selected that balances minimizes the wasted capacity while selecting a relatively small sub-band size. For a WDM system that supports channels of sizes 50 GHz, 75 GHz, 100 GHz, and 150 GHz, an optimal sub-band size is 300 GHz.

Depending on the particular implementation, one or more of the following criteria may be taking into account in determining when to assign sub-bands in step 110:
  Distance between the centers of two adjacent channel-width regions of previously allocated channels being less that some specified threshold, such as the sub-band size;
  Distance between the adjacent edges of two channel-width regions of previously allocated channels being less that some specified threshold, such as the size of the larger of the two corresponding channel widths;
  When the number of different possible sub-band sizes for the current state of the spectrum reaches one; and
  Preference to delay assignment of sub-bands.

Note that, in some implementations, the determination of sub-band size is independent of the determination of when to assign sub-bands, while, in other implementations, the determinations of sub-band size, sub-band locations, and when to assign sub-bands depend on one another. For example, at each iteration of the algorithm of FIG. 1, different sub-band sizes and different sub-band locations are evaluated against the current state of the spectrum to determine whether it is time to assign sub-bands.

In one possible implementation, an optimal sub-band size is pre-computed based on the different channel widths (e.g., 300 GHz for channel widths of 50 GHz, 75 GHz, 100 GHz, and 150 GHz). Sub-bands of that pre-computed size are then assigned when the smallest distance between the centers of any two adjacent existing channel-width regions reaches that optimal subband size. The locations of the existing channel-width regions in the spectrum will then be used to determine the locations of those sub-bands such that multiple channel widths within a single sub-band and/or the number of existing channels overlapping adjacent sub-bands are minimized or even avoided.

If the method determines, in step 110, that a sub-band constraint of a particular sub-band size should be added to the method, then, in step 112, that sub-band constraint is applied in subsequent executions of step 108 when subsequently allocating wavelength channels to new optical paths.

FIG. 1 depicts a method that may be, e.g., executed once per allocation of a new optical path. Those skilled in the art will understand that a similar algorithm comprising steps 102 and 104 can be performed after each de-allocation of an existing optical path. In that case, when a new optical path is to be allocated, e.g., the cost values from the previous execution of step 104 for the previous de-allocation of an optical path can be used without having to repeat steps 102 and 104 before performing step 108. Note that, in some implementations, if a sufficient number of optical paths are de-allocated, it may be useful to remove the previously defined set of spectral sub-bands for future allocations of wavelength channels. Subsequently defined spectral sub-bands could have the same or a different sizes, depending on the state of the subsequent spectrum configuration.

Figure 3:
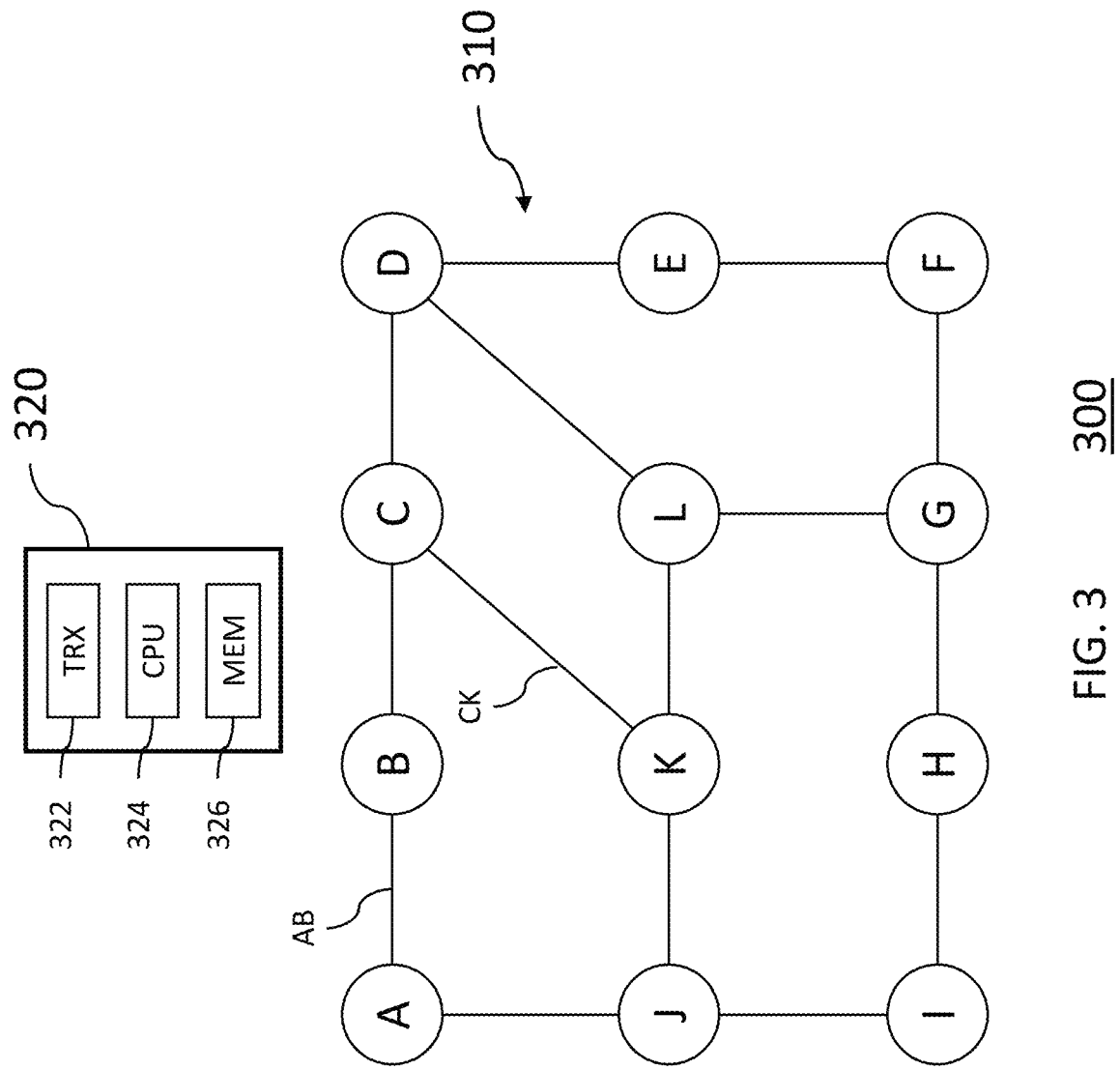
FIG. 3 is a simplified block diagram of an example WDM optical communication system according to certain embodiments of the disclosure.

FIG. 3 is a block diagram of an example WDM optical communication system 300 according to certain embodiments of the disclosure. As shown in FIG. 3, WDM system 300 has an optical mesh network 310 including 12 optical nodes A-L interconnected by 15 optical fiber spans, where each optical fiber span is identified by its two corresponding optical nodes. Each optical node A-L may have 2 or more optical fiber spans or directions terminated thereat and may enable optical switching between said optical fiber spans or directions, e.g., via a conventional optical add-crop multiplexer (OADM) and/or a conventional optical fiber cross-connect (OFC). Thus, the optical fiber span interconnecting optical nodes A and B may be referred to as optical fiber span AB (or equivalently as fiber BA, since each optical fiber span may be bi-directional or may be a pair of single-direction optical fibers for propagating signals in the opposite direction) and the optical fiber span interconnecting optical nodes C and K may be referred to as optical fiber span CK (or equivalently as fiber KC). Some such optical fiber spans may also include one or more in-line optical amplifiers.

WDM optical network 300 also includes a system controller 320, which includes a channel allocation controller to control the allocation of optical wavelength channels in the WDM optical network 300. In particular, the system controller 320 receives, e.g., from the optical nodes that are internal to the WDM optical network 300, requests for allocations of single wavelength channels for new optical fiber paths to support new communications as well as requests for de-allocations of existing allocations of wavelength channels for optical fiber paths. Here, an optical fiber path between source and destination optical nodes is typically allocated a single wavelength channel for carrying optical data communications over the sequence of optical fiber spans connecting the source and destination optical nodes. In response, for such a request for a new communication having a specified wavelength channel width, the system controller 320 may, e.g., perform the method of FIG. 1 to select a suitable set of available, contiguous frequency slots to form a single wavelength channel allocated to the optical fiber spans of an optical fiber path connecting the source and destination optical nodes for supporting the new communication. The system controller 320 then configures the corresponding optical nodes along that optical fiber path to support the new communication, e.g., to provide for the correct routing of the modulated optical wavelength signal between different optical fiber spans of the optical fiber path.

In some implementations, when the system controller 320 receives a request for a new communication having a specified channel width, the system controller 320 attempts to find an available optical fiber path connecting source and destination nodes to carry optical data communications over a same wavelength channel of a same width on each optical fiber span of the optical fiber path. If no suitable optical fiber path is available, the system controller 320 may attempt to find an available optical fiber path having the next larger wavelength channel width. The system controller 320 may continue to look for an available optical fiber path of larger and larger wavelength channel widths until the largest wavelength channel width is examined. In some implementations, the system controller 320 might not look for an available optical fiber path supporting a wavelength channel width smaller than the requested channel width.

As shown in FIG. 3, the system controller 320 includes (i) communication hardware (e.g., optical transceivers (TRX)) 322 that supports communications with other nodes, e.g., such as, but not limited to, the optical nodes of FIG. 3, (ii) a processor (e.g., CPU microprocessor) 324 that controls the operations of the system controller 320, and (iii) a memory 326 that stores code executed by the processor 324 and/or data generated and/or received by the system controller 320.

Figure 4A:
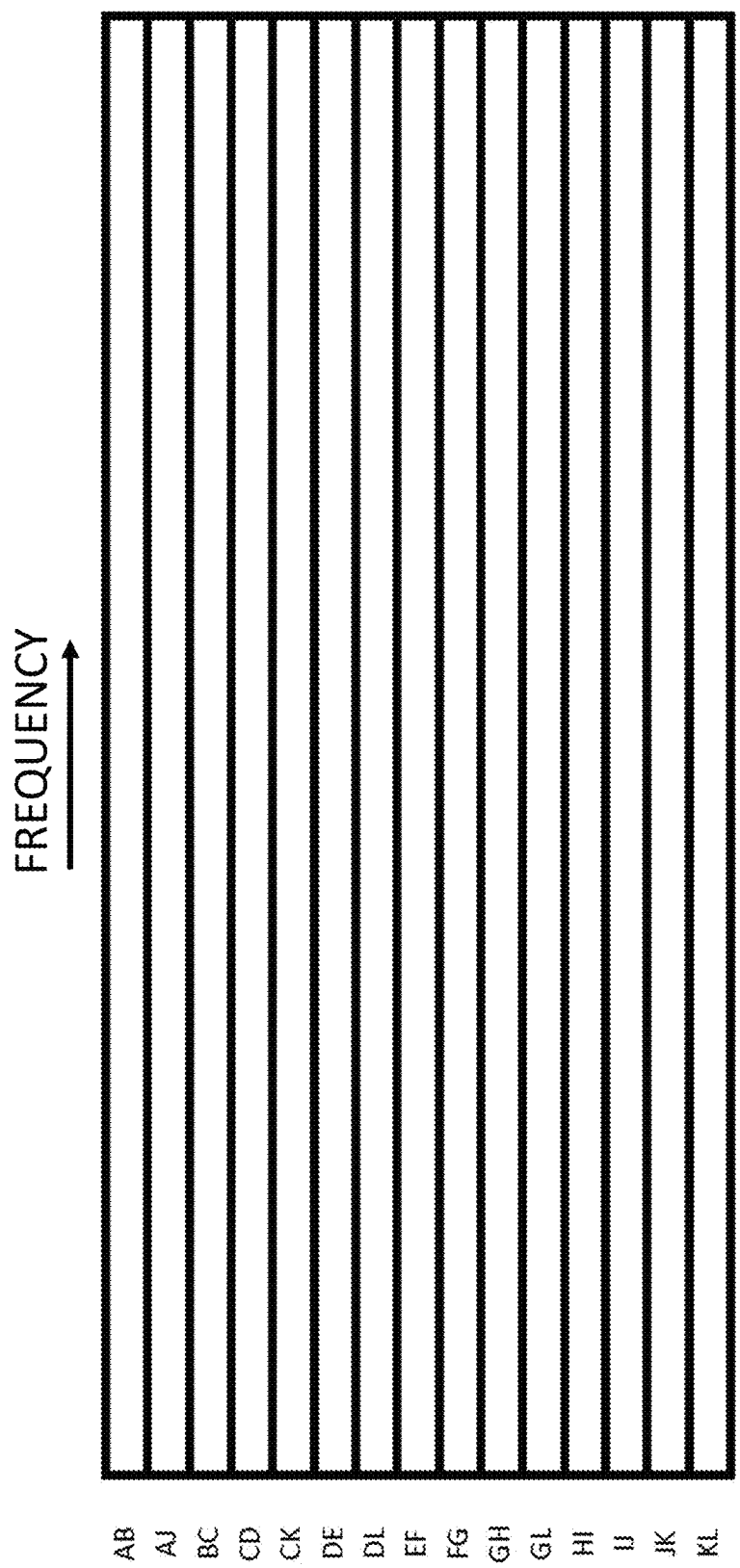
FIG. 4(A) is a graphical representation of the spectrum for the mesh network of FIG. 3 for a channel allocation table for use in embodiments where the spectrum is divided into 384 12.5 GHz frequency slots.

FIG. 4(A) is a schematical graphical representation of the predetermined optical spectrum 400 for optical data communications over the WDM optical mesh network 310 of FIG. 3 for an embodiment in which the optical spectrum is divided into 384 12.5 GHz frequency slots, where frequency increases from the lowest-frequency slot f0 on the left side of the spectrum 400 as depicted in FIG. 4(A) to the highest-frequency slot f384 on the right side of the optical spectrum 400 and where each row in the spectrum 400 corresponds to a different optical fiber span in optical mesh network 310. Note that the individual slots are not represented in FIG. 4(A) because there are too many of them to depict clearly.

Figure 4Q:
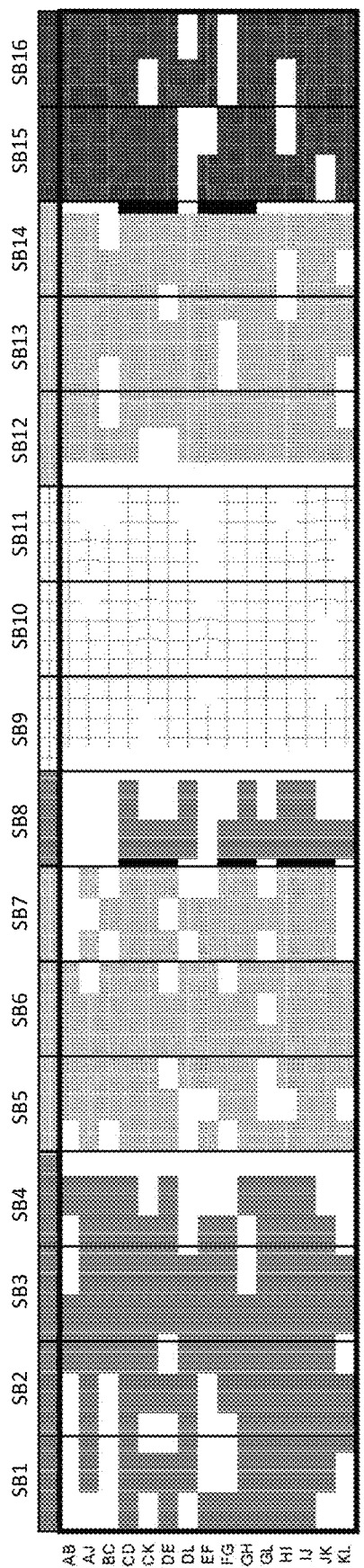

FIG. 4(B)-4(Q) are graphical representations of wavelength channel allocations, at different specific times, as the optical spectrum 400 of FIG. 4(A) becomes populated with the allocated wavelength channels for optical fiber paths in the optical mesh network 310 of FIG. 3 according to one example sequence of adding new optical fiber paths using the adaptive wavelength allocation method of FIG. 1. In this example, the WDM system supports optical channels having wavelength channel widths of 100 GHz, 112.5 GHz, 125 GHz, 137.5 GHz, and 150 GHz.

In particular, FIG. 4(B) represents the wavelength channel allocation state of the optical spectrum 400 after the initial optical fiber path (between optical nodes D and G via optical node L in the optical mesh network 310 of FIG. 3) has been provisioned with a single optical wavelength channel having a channel width of 137.5 GHz, i.e., by allocating the same 11 contiguous frequency slots near the middle of the optical spectrum 400 in each of fiber spans DL and LG. Note that the gray shading on the left side of the spectrum 400 corresponds to an SHB-exclusion zone that prevents any wavelength channels from being allocated at those frequency slots until the spectrum is sufficiently full. This first optical fiber path is allocated a wavelength channel located (in frequency) roughly midway between the low-frequency SHB-exclusion zone and the high-frequency end of the spectrum 400.

FIG. 4(C) represents wavelength channel allocation state of the optical spectrum 400 after the second optical fiber path (between optical nodes A and J in the optical mesh network 310 of FIG. 3) has been provisioned with a single optical wavelength channel having a wavelength channel width of 112.5 GHz allocated to 9 contiguous frequency slots on optical fiber span AJ. This second optical fiber path has been allocated a wavelength channel located (in frequency) roughly midway between the wavelength channel allocated to the first optical fiber path and the high-frequency end of the optical spectrum 400.

FIG. 4(D) represents the wavelength channel allocation state of the optical spectrum 400 after the third optical path (between optical nodes I and J in the optical mesh network 310 of FIG. 3) has been provisioned with an optical wavelength channel having a channel width of 137.5 GHz. Here, said wavelength channel is allocated to 11 contiguous frequency slots in fiber IJ. The single wavelength channel allocated to this third optical fiber path is located (in frequency) at the same 11 frequency slots used for the 137.5 GHz channel for the wavelength channel allocated to first optical fiber path, i.e., because the two optical fiber paths do not have common optical fiber span(s).

FIG. 4(E) represents the wavelength channel allocation state of the optical spectrum 400 after the fourth optical path (between optical nodes E and K via optical nodes D and C in the mesh network 310 of FIG. 3) has been provisioned with a single optical channel having a channel width of 100 GHz, i.e., by allocating the same 8 contiguous frequency slots in each of optical fiber spans ED, DC, and CK. This wavelength channel of the fourth optical path is located (in frequency) roughly midway between the SHB-exclusion zone and the optical spectral region where 137.5 GHz channels were already allocated.

FIG. 4(F) represents the wavelength channel allocation state of the optical spectrum 400 after the fifth optical path (between optical nodes E and L via optical node D in the mesh network 310 of FIG. 3) has been provisioned with a single optical wavelength channel having a channel width of 137.5 GHz, i.e., by allocating the same 11 contiguous frequency slots in each of optical fiber spans ED and DL. This fifth optical path is located (in frequency) near the other already-allocated 137.5 GHz channels. Note that the fifth optical path cannot be allocated to the same frequency slots as the first and third optical paths, because those frequency slots have already been allocated in the fiber DL for the first optical path.

FIG. 4(G) represents the wavelength channel allocation state of the optical spectrum 400 after the sixth optical path (between optical nodes A and L via optical nodes J and K in the mesh network 310 of FIG. 3) has been provisioned with a single optical wavelength channel having a channel width of 150 GHz, i.e., by allocating the same 12 contiguous frequency slots in each of fibers AJ, JK, and KL. This optical wavelength channel of the sixth optical path is located (in frequency) roughly midway between the optical spectral region where 112.5 GHz channels were already allocated and the high-frequency end of the optical spectrum 400.

FIG. 4(H) represents the wavelength channel allocation state of the optical spectrum 400 after a significant number of additional optical paths have been provisioned with single optical wavelength channels having various channel widths. As shown in FIG. 4(H), wavelength channels having the same wavelength channel width are allocated near each other and away from wavelength channels having different wavelength channel width. At this point in the sequence of allocating wavelength channels to new optical fiber paths, the method of FIG. 1 determines in step 110 that spectral sub-bands (SBs) need to be defined for controlling future allocations of wavelength channels to new optical paths, i.e., starting the new allocation of FIG. 4(I).

FIG. 4(I) represents the wavelength channel allocation state after the definition of a set of spectral sub-bands having a size of 300 GHz to cover the entire optical spectrum 400. In this particular example, 16 300 GHz spectral sub-bands SB1-SB16 were defined from the beginning of the optical spectrum 400. In other implementations, spectral sub-bands need not be applied at the beginning of the spectrum 400, i.e., the entire optical spectrum 400 may not be covered by the spectral sub-bands. In that case, a set of 15 300 GHz spectral sub-bands and two smaller spectral sub-bands may cover the entire optical spectrum 400. That is, one of the smaller spectral sub-bands may be at the low-frequency end of the spectrum 400, and the other of the smaller spectral sub-bands may be at the high-frequency end of the spectrum 400. At the time of FIG. 4(I), SB3 and SB4 are designated for 125 GHz wavelength channels, SB5 and SB6 are designated for 100 GHz wavelength channels, SB9, SB10, and SB11 are designated for 137.5 GHz wavelength channels, SB12 and SB13 are designated for 112.5 GHz wavelength channels, and SB15 and SB16 are designated for 150 GHz wavelength channels, because each of those spectral sub-bands already have at least one such wavelength channel allocated therein. Note that, at the time of FIG. 4(I), SB1, SB2, SB7, SB8, and SB14 are not yet designated for particular wavelength channel width, because there are no channels allocated within these spectral sub-bands yet.

FIG. 4(J) shows the wavelength channel allocation state of the optical spectrum 400 after the next new optical fiber path is provisioned with a single wavelength channel following the time of FIG. 4(I), indicating the continued definition of the same spectral sub-bands SB1-SB16.

FIG. 4(K) represents the wavelength channel allocation state of the optical spectrum 400 after another number of additional new optical fiber paths have been provisioned with single optical wavelength channels having various channel widths. FIG. 4(K) corresponds to a state in which the spectrum 400 is sufficiently filled with allocated wavelength channels that wavelength channels can start to be provisioned within the lower-frequency slots that are within the SHB-exclusion zone. As represented in FIG. 4(K), spectral sub-band SB2 has been designated for 125 GHz channels, and the spectral sub-band SB14 has been designated for 1 I2.5 GHz channels.

FIG. 4(L) represents the wavelength channel allocation state of the optical spectrum 400 after the next optical fiber path has been provisioned with a single optical wavelength channel after the time of FIG. 4(K) such that the spectral sub-band CBI has now been designated for 125 GHz channels.

FIG. 4(M) presents the wavelength channel allocation state of the optical spectrum 400 after the next optical path has been provisioned with a single optical wavelength channel after the time of FIG. 4(L).

FIG. 4(N) represents the wavelength channel allocation state of the optical spectrum 400 after another number of additional new optical paths have been provisioned with single optical wavelength channels having various channel widths. As represented in FIG. 4(N), spectral sub-band SB7 has been designated for 100 GHz channels.

FIG. 4(O) represents the wavelength channel allocation state of the optical spectrum 400 after the next optical fiber path has been provisioned with a single optical wavelength channel after the time of FIG. 4(N). This next optical fiber path is between optical nodes D and I via optical nodes C, K, and J in the optical mesh network 310 of FIG. 3 and required an optical channel of 125 GHz in each of fibers DC, CK, KJ, and JI. Since that optical fiber path was not available in any of the spectral sub-bands SB1-SB4, the adaptive wavelength allocation method of FIG. 1 provisioned that optical fiber path with a 125 GHz channel within spectral sub-band SB8, which had previously been undesignated, but is now designated for 125 GHz channels, even though that spectral sub-band is separated from the other 125 GHz spectral sub-bands SB1-SB4.

FIG. 4(P) represents the wavelength channel allocation state of the optical spectrum 400 after the next optical fiber path has been provisioned with a single optical wavelength channel after the time of FIG. 4(O).

FIG. 4(Q) represents the wavelength channel allocation state of the optical spectrum 400 after a significant number of additional new optical paths have been provisioned with single optical wavelength channels in the optical mesh network 310 of FIG. 3.

As is evident in FIG. 4(B)-4(Q), the method of FIG. 1, including the eventual application of spectral sub-bands and the eventual lifting of the SBH-exclusion zone constraint, generates optical wavelength channel allocation states of the optical spectrum with little fragmentation. The (dark) frequency slices at the beginning of spectral sub-band SB8 in optical fiber spans CD, CK, DE, FG, GH, HI, IJ, and JK and the (dark) frequency slices at the end of spectral sub-band SB14 in optical fiber spans CD, CK, DE, EF, FG, and GH represent fragmentation in the optical spectrum 400 corresponding to frequency slots that are too few in a contiguous frequency region to support any additional optical wavelength channels where the smallest available optical wavelength channel is 100 GHz. This fragmentation is less than the fragmentation that would result from some prior-art wavelength channel-allocation schemes for typical sequences of provisioning new optical fiber paths in the optical mesh network 310 of FIG. 3.

FIG. 5 shows pseudocode for one possible implementation of the process of updating the loading plan shown in steps 102-106 of FIG. 1. The pseudocode of FIG. 5 is applicable to the green field network scenario associated with the installation of an entirely new optical network.

In line 2 of the pseudocode, the row spectrum(1,wlg) is initiated with values to define the SHB-exclusion zone. spectrum, a two-dimensional array used to store the cumulative spectrum, has (i) a number of rows equal to grid_max (the number of frequency slots in the supported channel having the largest channel width) and (ii) a number of columns equal to the number of frequency slots in the spectrum. For a 4.8 THz spectrum having 12.5 GHz frequency slot that supports channels up to 150 GHz, grid_max is 12 and the number of frequency slots is 384. In that case, spectrum is a (12×384) array, where each row in spectrum corresponds to a channel having corresponding channel width. For example, row 4 in spectrum corresponds to a 4×12.5=50 GHz channel. Each column in spectrum corresponds to a corresponding frequency slot. For example, column 1 in spectrum corresponds to the lowest-frequency slot f1 in the spectrum, and column 384 corresponds to the highest-frequency slot f384.

Each element in spectrum represents the total number of optical fibers in the mesh network that already have the corresponding frequency slot allocated to the corresponding channel width. For example, spectrum(4,150)=7 means that there are seven fibers in the mesh network that have the frequency slot f150 allocated to the 50 GHz channel. Note that, in a network that supports fewer than grid_max channels, certain rows in spectrum will not be used. For example, in the network represented by FIG. 4(A)-4(Q) that supports channel widths of 100 GHz, 112.5 GHz, 125 GHz, 137.5 GHz, and 150 GHz, grid_max is 12 and rows 8-12 of spectrum correspond to those five different channel widths, respectively. Since channels smaller than 100 GHz are not supported in that example, row 1 of spectrum is used to define the SHB-exclusion zone, and rows 2-7 of spectrum are not used.

The SHB-exclusion zone is defined by setting the values of spectrum(1,wlg) to a large negative value (e.g., −1000) for the low-frequency slots corresponding to the SHB-exclusion zone in order to prevent channels from being allocated to those frequency slots, where wig is the frequency-slot index. The other values of spectrum(1,wlg) may be initialized to zero so as not to inhibit the ability of channels being allocated to those non-SHB-exclusion zone frequency slots. As described previous, after the spectrum has been sufficiently populated with channels allocated to higher-frequency slots such that channels can safely be allocated within the SHB-exclusion zone, all of the values in spectrum(1,wlg) can be re-set to zero. Note that this step is not reflected in the pseudocode of FIG. 5 or in the flow diagram of FIG. 1.

In line 3 of the pseudocode, gauss_cost is defined, where gauss_cost is a one-dimensional array having 384 elements representing the gaussian cost function. For example, for the gaussian cost function defined previously:

$$\text{gauss\_cost}(1,wlg)=\text{EXP}(-((0.01*wlg)^2)),$$

where EXP is the exponential function e.

In line 6, the elements of the two-dimensional array Loading_Plan_cost are initialized with low negative values (e.g., −1000). Similar to spectrum, Loading_Plan_cost has a number of rows equal to grid_max and a number of columns equal to the number of frequency slots in the spectrum. The element Loading_Plan_cost(g_id,wlg) represents the level of attractiveness of assigning the channel identified by the grid index g_id to the frequency slot wig, where a relatively high positive value indicates a high level of attractiveness and a relatively low negative value indicates a low level of attractiveness. The elements of Loading_Plan_cost are initialized to low negative values such as −1000 so that rows of spectrum that do not have corresponding channels (e.g., rows 2-7 in the previous example) will be prevented from being assigned to any frequency slots.

As defined by lines 7 and 18, lines 10 to 17 are iteratively implemented for each value of an index value grid_id running from 1 to grid_max, where the current value of grid_id indicates the current channel width.

In line 10, the one-dimensional, 384-element array spectrum_tmp is the portion of the cumulative spectrum corresponding to the current channel width indicated by grid_id. For each element in spectrum_tmp representing a different frequency slot in the spectrum, the function Application.Index returns the number of spans in the mesh network having the corresponding frequency slot allocated to a channel having a channel width indicated by grid_id. Line 10 of the pseudocode corresponds to step 102 of FIG. 1 for each channel width.

In line 11, the one-dimensional, 384-element array cost is generated for the current channel width by convolving the cumulative spectrum spectrum_temp for the current channel width with the gaussian cost function gauss_cost, where each element cost(wlg) is the appropriately phased, convolution product (e.g., vector dot product) of spectrum_temp and gauss_cost for the corresponding frequency slot wig.

As defined by lines 12 and 17, lines 13-16 are implemented for each value of a second channel width index value g_id running from 1 to grid_max.

In line 13, if the channel width indicated by g_id is equal to the channel width indicated by grid_id, then the coefficient attractive_cost is set equal to 1. Otherwise, attractive_cost is set equal to −1.

As defined by lines 14 and 16, line 15 is implemented for each frequency slot in the spectrum.

In line 15, the element (g_id,wlg) in the two-dimensional array Loading_Plan_cost is incremented by the product of attractive_cost and cost(wlg), such that, if g_id and grid_id indicate the same channel width, then the element Loading_Plan_cost(g_id,wlg) is increased by the cost value cost(wlg); otherwise, it is decreased by the cost value cost(wlg). Lines 11-17 of the pseudocode correspond to step 104 of FIG. 1.

As defined by lines 20 and 22, line 21 is implemented for each value of channel width index grid_id running from 1 to grid_max.

In line 21, the corresponding row in the two-dimensional, grid_max-row, 384-column, loading-plan array Loading-Plan is defined by sorting the values in the corresponding row of Loading_Plan_cost in decreasing order, keeping track of the frequency slots corresponding to the sorted costs. Lines 20-22 of the pseudocode correspond to step 106 of FIG. 1.

In the embodiments described above, the adaptive wavelength allocation algorithm is configured such that each sub-band contains only allocated channels of a single channel width. In some alternative embodiments, a given sub-band may be allowed to support channels of two or more different channel widths without significantly increasing network fragmentation. For example, because 100 is an integer multiple of 50, channels having a 50 GHz channel width may share the same sub-band as channels having a 100 GHz channel width. Likewise, for channels having a 75 GHz channel width and channels having a 105 GHz channel width may share the same sub-band. Note that, since 200 is an integer multiple of both 100 and 50, channels having channel widths of 50 GHz, 100 GHz, and 200 GHz may all share the same sub-band. Note further that allowing a subset of the allowable channel widths to share the same sub-band may be implemented in systems that assign sub-bands in a non-adaptive manner, such as those systems that assign sub-bands prior to the first channel allocation in the spectrum.

FIG. 6 schematically illustrates a method 500 for operating a WDM optical network having a plurality of optical nodes. In various examples, the optical network may have various topologies, e.g., a ring, mesh, etc. In the WDM optical network, pairs of the optical nodes are connected by optical fiber paths formed by one or more optical fiber spans. The method 500 may use a channel allocation table for management of the optical fiber spans, e.g., a channel allocation table 400 as in FIG. 4A, and may perform various write and read operations on said channel allocation table, e.g., as schematically illustrated in FIGS. 4B-4Q. The method 500 may be performed, e.g., by an electronic channel allocation controller capable of communicating with the optical nodes of the optical network, e.g., to receive requests for communication channel allocations and to transmit information on optical wavelength channel allocations as determined. As an example, the system controller 320 of FIG. 3 may act as such a channel allocation controller to receive such requests, to process such requests, and to transmit information on resulting optical wavelength channel allocations to the optical nodes. In various examples, the method 500, may determine optical wavelength channel allocations and define sets of optical sub-bands based on the state of the optical communication network, e.g., as in previously described methods and/or in other methods as further described below.

The method 500 includes for each one of a plurality of optical fiber paths, allocating an optical wavelength channel such that the allocated optical wavelength channel can support optical communications over each optical fiber span of the one of the optical fiber paths (step 502). Here, the one of the optical fiber paths provides an optical communications connection between a pair of the optical nodes of the optical network.

The method 500 includes updating a channel allocation table in response to performing the allocating for one or more of the optical fiber paths (step 504). The channel allocation table indicates optical wavelength channels allocated to the various optical fiber spans of the optical network.

The step 502 of allocating includes determining the optical wavelength channel to be allocated based on the channel allocation state of the optical network, as defined by the channel allocation table, i.e., prior to the new allocation.

The determining the optical wavelength channel of the step 502 may include act(s) of finding unused spectrum for the new optical wavelength channel to be allocated and/or finding an advantageous part of the optical spectrum for the new optical wavelength channel, e.g., next to or adjacent to allocated optical wavelength channels of the same width. The act(s) may be based on various methods of evaluating the state of the optical network.

In some embodiments of the method 500, the channel allocation table may include an indication of a width for the optical wavelength channel(s) allocated to one or more of the optical fiber spans. In such embodiments, the step 502 of allocating may cause one or more of the optical fiber spans of the optical network to be allocated optical wavelength channels of different widths.

In some embodiments, the method 500 may further include for at least a particular one of the optical fiber paths, deallocating the optical wavelength channel previously allocated thereto and updating the channel allocation table to indicate that said optical wavelength channel is not allocated to the optical fiber span(s) of the optical network.

In some embodiments, the method 500 may further include defining a set of optical sub-bands to cover a part of the optical spectrum in response to a state of the allocation table satisfying a fullness property, e.g., obtaining a minimum density of allocations on the optical spectrum. As an example, the set of optical sub-bands may be defined to cover the C and/or L telecommunication bands or some substantial contiguous part thereof. The defining step is such that each of the already allocated optical wavelength channels is located in, i.e., contained in, one of the optical sub-bands. After the definition of the set of optical-sub-bands and in response thereto, the method 500 may further include allocating second optical wavelength channel(s) to support optical communications over each optical fiber span of other optical fiber path(s) and then, suitably updating the channel allocation table. Any such further allocations are made such that each second optical wavelength channel is in one of the optical sub-bands.

Such second optical wavelength channels may be allocated to be at an edge of the one of the optical sub-bands or to be next to an already allocated wavelength channel in one of the defined optical sub-bands. That is, the channel allocations may be done so that allocated optical wavelength channels are adjacent each other in the one of the defined optical sub-bands from one edge thereof. Such adjacent packing of allocated optical wavelength channels may be such that adjacent ones of the optical wavelength channels overlap at magnitude values that are less than one of 2.5 bB, 3 dB, 3.5 dB, 4 dB, 4.5 dB, and 5 dB of their peak magnitude values. Such types of allocations can provide for use the available part of the optical spectrum without the creation of unusable, e.g., too narrow, unallocated portions of the optical spectrum.

In response to the defining a set of optical sub-bands, the method 50 may also include allocating optical wavelength channels, in at least one of the optical sub-bands, with a minimal width for optical wavelength channels therein and with an integer multiple of the minimal width, wherein the integer is two or more. Thus, some of the optical sub-bands may be populated with allocations of optical wavelength channels of a single width, while other(s) of the optical sub-bands may have allocations therein of optical wavelength channel of multiple widths. Such allocations in an individual one of the optical sub-bands are typically integer multiples of a minimal allocation width, wherein the individual one of the optical sub-bands has a width that is an integer multiple of said minimal allocation width. With such a constraint, the various optical wavelength channel allocations can fill the optical sub-bands without creating lost or unusable optical spectrum therein.

Figure 7:
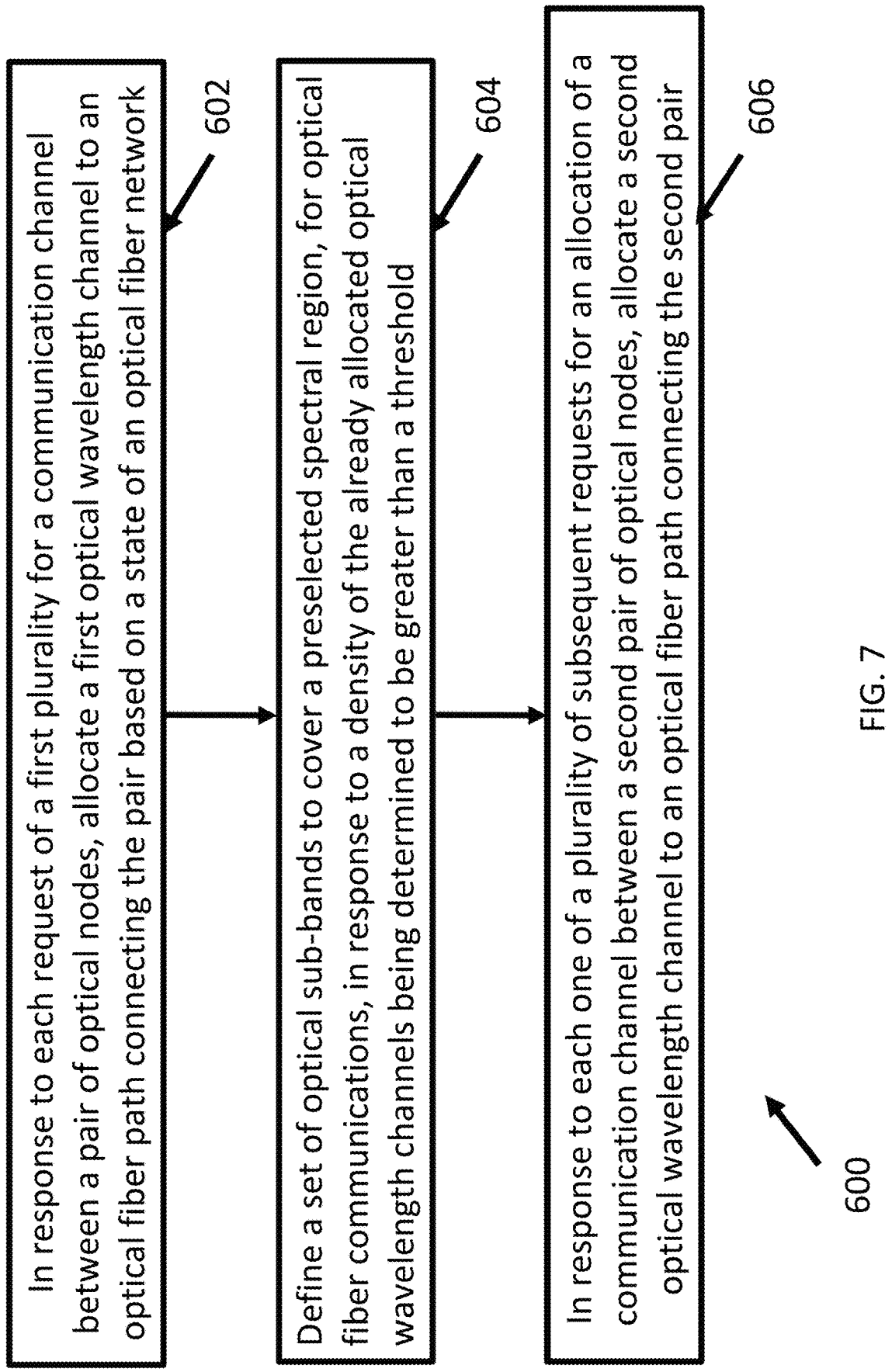
FIG. 7 illustrates a method of allocating optical wavelength channels in an optical network, e.g., as in FIG. 3, wherein the method includes defining a set of optical sub-bands to limit such allocations in response to a triggering event, e.g., as for the system of FIG. 3.

FIG. 7 illustrates another method 600 for operating a WDM optical fiber network, e.g., a ring, mesh, or other topology network. The method 600 may be performed, e.g., by an electronic channel allocation controller able to communicate with the optical nodes of the WDM optical fiber network. As an example, the system controller 320 of FIG. 3 may act as such an electronic channel allocation controller and may receive requests for communication channels from the optical nodes of the WDM optical fiber network and transmit indications of resulting optical wavelength channel allocations to the optical nodes. In various examples, the method 600 may determine such optical wavelength channel allocations and define sets of optical sub-bands based on previously defined examples of methods and/or based on other methods.

The method 600 includes, in response to each request of a first plurality for a communication channel between a pair of optical nodes of the optical fiber network, allocating a first optical wavelength channel to an optical fiber path connecting the pair based on a state of an optical fiber network (step 602).

The method 600 includes defining a set of optical sub-bands to cover a preselected spectral region, for optical fiber communications, in response to a density of the already allocated optical wavelength channels being determined to be greater than a threshold, e.g., a fullness value for the preselected spectral region (step 604). The step 604 typically involves defining the set of optical sub-bands such that each of the already allocated optical wavelength channels is in or contained in one of the optical sub-bands. That is, the already allocated optical wavelength channels typically do not extend across boundaries between said optical sub-bands of the defined set and are not outside of all of the optical sub-bands, though some amount of such initial overlap of multiple optical sub-bands may be allowed.

The method 600 includes, in response to each one of a plurality of subsequent requests for an allocation of a communication channel between a second pair of optical nodes, allocating a second optical wavelength channel to an optical fiber path connecting the second pair (step 606). These further allocations are performed such that each such second optical wavelength channel is contained in one of the optical sub-bands. Each one of the optical sub-bands has a size enabling allocation therein of a plurality of adjacent wavelength channels of one width or of more than one width. Each such act of allocating a second optical wavelength channel may be made such that the second channel is allocated adjacent to an edge of one of the optical sub-bands or adjacent to another optical wavelength channel allocated to the same one of the optical sub-bands. That is, the allocated optical wavelength channels may be packed to be adjacent to each other in individual ones of the optical sub-bands from one edge thereof. Such adjacent packing of allocated optical wavelength channels may be such that adjacent ones of the optical wavelength channels overlap at magnitude values that are less than one of 2.5 bB, 3 dB, 3.5 dB, 4 dB, 4.5, and 5 dB of peak magnitudes of said optical wavelength channels. Such tight packing of optical wavelength channel allocations can avoid the generation of un-allocated regions that are too narrow for future allocations of an optical wavelength channel.

In some embodiments of the method 600, the step 602 may perform some of the allocations by also determining whether the density has exceeded the threshold and then individually assigning one of the first optical wavelength channels in response the density not exceeding the threshold.

In any embodiments of the method 600, different ones of the optical sub-bands may have a same first width and/or some of the optical sub-bands may have a different second width.

In some embodiments of the method 600, the step 606 of allocating a second optical wavelength channel may include allocating optical wavelength channels of different widths to one or more of the optical sub-bands. In such embodiments, the second optical wavelength channel allocated to an individual one of the one or more optical sub-bands may have a different width than a minimum width for optical wavelength channels allocated to said individual one of the one or more optical sub-bands. The different width may be an integer times the minimum width, i.e., wherein the integer is two or more. For example, such an optical sub-band may have optical wavelength channels allocated thereto with widths that are 1, 2, 3, 4, 5, etc. times the minimal width for allocations thereto.

In any embodiments of the method 600, the step 604 of defining a set of optical sub-bands may include defining said optical sub-bands to be of equal size except optionally the optical sub-band at one or both sides of the spectral region for allocation. The size of individual optical sub-bands may be predetermined or may be computed based criteria such as:

initial fullness of optical sub-bands with allocated optical wavelength channels,
  available optical wavelength channel widths,
  reduction of a presence, e.g., an initial presence, of optical wavelength channels of different widths in the same optical sub-band, and/or
  reduction of occurrences of already allocated optical wavelength channels overlapping two optical sub-bands.

Some embodiments may define the optical sub-bands of equal size to have a minimal size based the widths of possible optical wavelength channel. Such a minimal size would fit an integer number any of the optical wavelength channels. For example, if the available or allocated optical wavelength channel widths are 50 GHz, 75 GHz, and 100 GHZ, an integer number of each such channels would fit in an optical sub-band of size 300 GHz, 600 GHz, 900 GHz, etc., and the minimal size for an optical sub-band would be 300 GHz.

In any embodiments of the method 600, the step 604 of defining a set of optical sub-bands may be triggered by an average spacing between already allocated optical wavelength channels being of order of a predetermined or estimated size for the optical sub-bands of equal size. For example, said triggering may be responsive to the average spacing between already allocated optical wavelength channels being any of 10, 5, 3, 2, or 1 times such predetermined or estimated size. Alternatively, the triggering may be responsive to the one or more of the distances between areas already allocated to different optical wavelength channel widths becoming of order of such a predetermined or estimated optical sub-band size, e.g., 1, 2, 3, 4, 5, or even 10 times said size. As an example, the triggering may occur in response to only one candidate for the optical sub-band size remaining available.

Although the disclosure has been described in the context of Gaussian cost functions, those skilled in the art will understand that the disclosure can be implemented using other suitable cost functions that tend to result in allocated channels of the same channel width being grouped together in the spectrum.

Although the disclosure has been described in the context of embodiments that apply optical sub-bands of the same size when the optical spectrum configuration gets sufficiently full of optical wavelength channel allocations, in some embodiments, spectral sub-bands may not be defined. In other embodiments, optical sub-bands of different sizes may be defined when the optical spectrum is sufficiently full.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred—to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method comprising:
   for each one of a plurality of optical fiber paths in an optical network, allocating an optical wavelength channel in an optical spectrum such that the allocated optical wavelength channel is assigned to support optical communications over one of the optical fiber paths on each optical fiber span thereof; and
   updating a channel allocation table in response to performing the allocating for one or more of the optical fiber paths, the channel allocation table indicating optical wavelength channels allocated to the optical fiber spans of the optical network and including indications of widths of the optical wavelength channels allocated to the optical fiber spans; and
   wherein the act of allocating includes determining the optical wavelength channel to be allocated based on a state of the optical network as defined by the channel allocation table;
   wherein the allocating causes at least a first of the optical fiber paths and a second of the optical fiber paths to be allocated optical wavelength channels of different widths; and
   wherein the method further comprises defining a set of optical sub-bands to cover a part of the optical spectrum in response to a state of the channel allocation table satisfying a fullness property, the optical sub-bands being defined such that each of the allocated wavelength channels is located in one of the optical sub-bands.

2. The method of claim 1, further comprising for at least a particular one of the optical fiber paths deallocating a particular one of the optical wavelength channels previously allocated thereto and updating the channel allocation table to indicate that the particular one of the optical wavelength channels is not allocated.

3. The method of claim 1 comprising, in response to the defining of the set of optical sub-bands, allocating at least a second optical wavelength channel to support optical communications such that the second optical wavelength channel is in one of the optical sub-bands.

4. The method of claim 3, wherein the allocating at least a second optical wavelength channel includes allocating said second optical wavelength channel to be at an edge of the one of the optical sub-bands or to be next to another allocated wavelength channel in the one of the optical sub-bands.

5. The method of claim 3, wherein the allocating at least a second one of the optical channels allocates optical wavelength channels of a same minimal width to one or more of the sub-bands.

6. The method of claim 1, comprising, in response to the defining the set of optical sub-bands, allocating one or more optical wavelength channels, in at least one of the optical sub-bands, with a minimal width for optical wavelength channels in the at least one of the optical sub-bands and allocating one or more other optical wavelength channels, in the at least one of the optical sub-bands, with an integer multiple of the minimal width, the integer being two or more.

7. An apparatus, comprising:
   a channel allocation controller capable of communicating with optical nodes of an optical network and for each one of a plurality of optical fiber paths, capable of allocating an optical wavelength channel in an optical spectrum to support optical communications between a pair of optical nodes over the one of the plurality of optical fiber paths on each optical fiber span thereof;
   wherein the channel allocation controller is configured to update a channel allocation table in response to allocating an optical wavelength channel, the channel allocation table indicating those of the optical wavelength channels allocated to the optical fiber spans of the optical network;
   wherein the channel allocation controller is configured to determine the optical wavelength channel to be allocated based on a state of the optical network as defined by the allocation table and to write to the channel allocation table an indication of widths of the optical wavelength channels allocated to the optical fiber spans;
   wherein the channel allocation controller is capable of allocating, to a first optical fiber path of the optical network, an optical wavelength channel of a different width than an optical wavelength channel already allocated to a second optical fiber path thereof; and
   wherein the channel allocation controller is configured to define a set of optical sub-bands to cover a part of the optical spectrum in response to a state of the allocation table satisfying a fullness property, the optical sub-bands being defined such that each of the allocated wavelength channels is located in one of the optical sub-bands.

8. The apparatus of claim 7, wherein the channel allocation controller is configured to deallocate a particular one of the optical fiber paths by updating the allocation table to not indicate allocation of an optical wavelength channel previously allocated.

9. The apparatus of claim 7, wherein in response to the defining the set of optical sub-bands, the channel allocation controller is configured to allocate at least a second optical wavelength channel to support optical communications such that the second optical wavelength channel is in one of the defined optical sub-bands.

10. The apparatus of claim 9, wherein the channel allocation controller is configured to allocate the at least a second optical wavelength channel to be at an edge of the one of the defined optical sub-bands or to be next to another allocated wavelength channel in the one of the optical sub-bands.

11. The apparatus of claim 9, wherein in response to the defining the set of optical sub-bands, the channel allocation controller is configured to allocate one or more optical wavelength channels, in at least one of the optical sub-bands, with a minimal width for optical wavelength channels in the at least one of the optical sub-bands and to allocate one or more other optical wavelength channels, in the at least one of the optical sub-bands, with an integer multiple of the minimal width, the integer being two or more.

12. A method comprising:
   for each one of a plurality of optical fiber paths in an optical network, allocating an optical wavelength channel in an optical spectrum such that the allocated optical wavelength channel is assigned to support optical communications over one of the optical fiber paths on each optical fiber span thereof;
   updating a channel allocation table in response to performing the allocating for one or more of the optical fiber paths, the channel allocation table indicating optical wavelength channels allocated to the optical fiber spans of the optical network, the act of allocating including determining the optical wavelength channel to be allocated based on a state of the optical network as defined by the channel allocation table; and defining a set of optical sub-bands to cover a part of the optical spectrum in response to a state of the channel allocation table satisfying a fullness property, the optical sub-bands being defined such that each of the allocated wavelength channels is located in one of the optical sub-bands.

13. The method of claim 12, wherein the channel allocation table includes indications of widths of the optical wavelength channels allocated to the optical fiber spans; and wherein the allocating causes at least a first of the optical fiber paths and a second of the optical fiber paths to be allocated optical wavelength channels of different widths.

14. The method of claim 12 comprising, in response to the defining the set of optical sub-bands, allocating at least a second optical wavelength channel to support optical communications such that the second optical wavelength channel is in one of the optical sub-bands.

15. The method of claim 14, wherein in response to the defining the set of optical sub-bands, allocating one or more optical wavelength channels, in at least one of the optical sub-bands, with a minimal width for optical wavelength channels in the at least one of the optical sub-bands, and allocating one or more other optical wavelength channels, in the at least one of the optical sub-bands, with an integer multiple of the minimal width, the integer being two or more.

16. An apparatus, comprising:

a channel allocation controller capable of communicating with optical nodes of an optical network and for each one of a plurality of optical fiber paths, capable of allocating an optical wavelength channel in an optical spectrum to support optical communications between a pair of optical nodes over the one of the plurality of optical fiber paths on each optical fiber span thereof; and wherein the channel allocation controller is configured to update a channel allocation table in response to the allocating an optical wavelength channel, the channel allocation table indicating those of the optical wavelength channels allocated to the optical fiber spans of the optical network;

wherein the channel allocation controller is configured to determine the optical wavelength channel to be allocated based on a state of the optical network as defined by the allocation table; and wherein the channel allocation controller is configured to define a set of optical sub-bands to cover a part of the optical spectrum in response to a state of the allocation table satisfying a fullness property, the optical sub-bands being defined such that each of the allocated wavelength channels is located in one of the optical sub-bands.

17. The apparatus of claim 16, wherein the channel allocation controller is configured to write to the channel allocation table an indication of widths of the optical wavelength channels allocated to the optical fiber spans; and wherein the channel allocation controller is capable of allocating at least to a first optical fiber path of the optical network an optical wavelength channel of a different width than an optical wavelength channel already allocated to a second optical fiber path of the optical fiber network.

18. The apparatus of claim 16, wherein in response to the defining the set of optical sub-bands, the channel allocation controller is configured to allocate optical wavelength channels, in at least one of the optical sub-bands, with a minimal width for the one of the optical sub-bands or having an integer multiple of the minimal width, the integer being two or more.

* * * * *